United States Patent
Hearon

(10) Patent No.: US 10,144,840 B2
(45) Date of Patent: Dec. 4, 2018

(54) ONE-POT, HIGH-PERFORMANCE RECYCLING OF POLYMER WASTE USING RENEWABLE POLYMER SYNTHESIS

(71) Applicant: Poly6 Technologies, Boston, MA (US)

(72) Inventor: Keith Hearon, Boston, MA (US)

(73) Assignee: Poly6 Technologies, Boston, MA (US)

( * ) Notice: Subject to any disclaimer, the term of this patent is extended or adjusted under 35 U.S.C. 154(b) by 87 days.

(21) Appl. No.: 15/263,107

(22) Filed: Sep. 12, 2016

(65) Prior Publication Data

US 2016/0376453 A1 Dec. 29, 2016

Related U.S. Application Data

(63) Continuation-in-part of application No. 14/204,458, filed on Mar. 11, 2014, now Pat. No. 9,441,084.

(60) Provisional application No. 62/338,857, filed on May 19, 2016, provisional application No. 61/897,010, filed on Oct. 29, 2013, provisional application No. 61/779,078, filed on Mar. 13, 2013.

(51) Int. Cl.
| | |
|---|---|
| C09D 11/30 | (2014.01) |
| C09D 11/102 | (2014.01) |
| C09D 11/108 | (2014.01) |
| B41J 2/01 | (2006.01) |
| C08L 81/02 | (2006.01) |

(52) U.S. Cl.
CPC ............ *C09D 11/30* (2013.01); *B41J 2/01* (2013.01); *C08L 81/02* (2013.01); *C09D 11/102* (2013.01); *C09D 11/108* (2013.01); *Y02P 20/143* (2015.11); *Y02W 30/70* (2015.05)

(58) Field of Classification Search
CPC .......... B41J 2/01; C08L 81/02; C09D 11/102; C09D 11/108; C09D 11/30; Y02P 20/143; Y02W 30/70
See application file for complete search history.

(56) References Cited

U.S. PATENT DOCUMENTS

| | | | |
|---|---|---|---|
| 6,525,168 B2 | 2/2003 | Zook | |
| 7,288,608 B2 | 10/2007 | Bowman | |
| 2008/0121140 A1 | 5/2008 | Fenn | |
| 2010/0227949 A1* | 9/2010 | Tamai | C08F 299/00 523/400 |
| 2011/0319559 A1 | 12/2011 | Kania | |

FOREIGN PATENT DOCUMENTS

| | | |
|---|---|---|
| EP | 1130070 | 9/2001 |
| EP | 1477511 | 11/2004 |

OTHER PUBLICATIONS

Claudino, et al., "Thiol-ene coupling kinetics of D-limonene: a versatile 'non-click' free-radical reaction involving a natural terpene", J RSC, 3:11021-34 (2013a).
Claudino, "Macromolecular Design: UV-curable Thiol-ene networks based on renewable resources", Doctoral Thesis in Polymer Technology, Stockholm, Sweden (2013b).
Firdaus, et a., "Terpene-based renewable monomers and polymers via thiol-ene additions", Macromolecules, 44:7253-62 (2011).
Norstrom, Terpenes as renewable monomers for biobased materials, Master of Science thesis, Stockholm, Sweden (2011).
Zhao and Schlaad, "Synthesis of terpene-based polymers", Adv Polym Sci., DOI: 10.1007/12_2011_166 (2012).

* cited by examiner

*Primary Examiner* — Frances Tischler
(74) *Attorney, Agent, or Firm* — Pabst Patent Group LLP

(57) ABSTRACT

Curable formulations, cured formulations, and mixtures and composites thereof are described herein, as well as methods of making and using the formulations, mixtures, and composites.

39 Claims, No Drawings

ONE-POT, HIGH-PERFORMANCE RECYCLING OF POLYMER WASTE USING RENEWABLE POLYMER SYNTHESIS

CROSS REFERENCE TO RELATED APPLICATIONS

This application is a continuation-in-part of U.S. application Ser. No. 14/204,458, filed on Mar. 11, 2014, issuing as U.S. Pat. No. 9,441,084 on Sep. 13, 2016, which claims priority to and benefit of U.S. Provisional Application No. 61/779,078, filed on Mar. 13, 2013, and U.S. Provisional Application No. 61/897,010, filed on Oct. 29, 2013. This application also claims priority to and benefit of U.S. Provisional Application No. 62/338,857, filed on May 19, 2016. These are hereby incorporated herein by reference in their entirety.

FIELD OF THE INVENTION

This invention is in the field of monomers, oligomers, polymers, additive and composites and methods of making and using thereof. The invention includes solvent chemical compositions, polymeric formulations, methods of synthesis, and fabrication methods of polymers.

BACKGROUND OF THE INVENTION

Synthetic materials improve human life in tremendous ways, and materials innovation has played a major role in shaping the evolution of modern technology. Unfortunately, many materials on and with which our society is built afford tremendous environmental problems. Approximately 23% of all fossil fuel greenhouse gas (GHG) emissions arise from material production, society throws away 590 billion pounds of non-degradable polymer waste into the environment each year, and the toxic and wasteful processes used to produce many materials bring dangerous chemicals into our homes and the environment.

When manufacturers select materials to use in their products, material performance, processing capability and economics largely drive the material selection process. Additionally, while materials' environmental impacts are often factored into the material selection process, environmental considerations alone rarely drive material adoption.

Thus, there exists in society a materials problem, in particular, for materials with higher performance qualities, better processing capabilities, and more competitive economics.

Therefore, it is an object of the invention to provide novel curable formulations with higher performance qualities, better processing capabilities, and more competitive economics.

It is a further object to provide new formulations, methods of making, manufacturing methods thereof and articles of manufacture made from such formulations having improved performance, tunable properties, processing, cost, and environmental benefits.

SUMMARY OF THE INVENTION

Curable formulations which possess tunable chemical functionalities and physical properties that enable the syntheses of new materials, composites, and articles of manufacture have been developed. Specific embodiments include: Curable formulations which are formed from monomers, oligomers, and which can be cured, formed into blends or composites containing fillers and/or additives; Methods of making such curable formulations, cured formulations thereof, and composites thereof; (3) Methods of using and manufacturing articles formed from such curable formulations, cured formulations thereof, and composites thereof; and (4) Articles of manufacture formed from such compounds, materials, composites, and compositions thereof.

In these embodiments, curable formulations of monomeric and/or oligomeric precursors are formed via chemistries that enable desirable material performance and tunable physical and thermomechanical properties to be obtained. Desirable material performance and tunable physical and thermomechanical properties include, but are not limited to, high toughness, optical clarity, high tensile strength, good solvent resistance, good thermal resistance, tunable modulus, viscosity, tunable glass transition temperature, tunable cure time, and tunable surface adhesion. Composites and other compositions thereof can be formed from the curable formulations.

Methods for making the curable formulations, cured formulations thereof, and other composites thereof are also described herein. In some embodiments, the methods are low waste methods which generally do not require any or any significant purification of the formulations, composites, or of reaction products therein. The curable or cured formulations, composites, and other compositions thereof formed from the precursors as described above and as shown in the examples generally proceed in additive "one pot" steps.

The curable formulations also permit for their use in methods of manufacture, such as thin-film deposition, 3-D printing, and coating of substrates. Methods that are used to manufacture materials from the curable formulations are significantly influenced by material processing capability, and processing capability often refers to a material's ability to be successfully and efficiently subjected to various methods of manufacture.

DETAILED DESCRIPTION OF THE INVENTION

I. Definitions

As used herein, the term "analog" refers to a chemical compound with a structure similar to that of another (reference compound) but differing from it in respect to a particular component, functional group, atom, etc. As used herein, the term "derivative" refers to compounds which are formed from a parent compound by chemical reaction(s). These differences in suitable analogues and derivatives include, but are not limited to, replacement of one or more functional groups on the ring with one or more different functional groups or reacting one or more functional groups on the ring to introduce one or more substituents.

"Aryl", as used herein, refers to 5-, 6- and 7-membered aromatic, heterocyclic, fused aromatic, fused heterocyclic, biaromatic, or biheterocyclic ring system, optionally substituted by halogens, alkyl-, alkenyl-, and alkynyl-groups. Broadly defined, "Ar", as used herein, includes 5-, 6- and 7-membered single-ring aromatic groups that may include from zero to four heteroatoms, for example, benzene, pyrrole, furan, thiophene, imidazole, oxazole, thiazole, triazole, pyrazole, pyridine, pyrazine, pyridazine and pyrimidine, and the like. Those aryl groups having heteroatoms in the ring structure may also be referred to as "aryl heterocycles" or "heteroaromatics". The aromatic ring can be substituted at one or more ring positions with such substituents as described herein, for example, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF$_3$, —CN, or the like. The term "Ar" also includes polycyclic ring systems having two or more cyclic rings in which two or more carbons are common to two adjoining rings (the rings are "fused rings") where at least one of the rings is aromatic, e.g., the other cyclic rings can be cycloalkyls, cycloalkenyls, cycloalkynyls, aryls and/or heterocycles. Examples of heterocyclic ring include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl.

"Alkyl", as used herein, refers to the radical of saturated or unsaturated aliphatic groups, including straight-chain alkyl, alkenyl, or alkynyl groups, branched-chain alkyl, alkenyl, or alkynyl groups, cycloalkyl, cycloalkenyl, or cycloalkynyl (alicyclic) groups, alkyl substituted cycloalkyl, cycloalkenyl, or cycloalkynyl groups, and cycloalkyl substituted alkyl, alkenyl, or alkynyl groups. Unless otherwise indicated, a straight chain or branched chain alkyl has 30 or fewer carbon atoms in its backbone (e.g., C$_1$-C$_{30}$ for straight chain, C$_3$-C$_{30}$ for branched chain), and more preferably 20 or fewer. Likewise, preferred cycloalkyls have from 3-10 carbon atoms in their ring structure, and more preferably have 5, 6 or 7 carbons in the ring structure.

"Alkylaryl", as used herein, refers to an alkyl group substituted with an aryl group (e.g., an aromatic or heteroaromatic group).

"Heterocycle" or "heterocyclic", as used herein, refers to a cyclic radical attached via a ring carbon or nitrogen of a monocyclic or bicyclic ring containing 3-10 ring atoms, and preferably from 5-6 ring atoms, consisting of carbon and one to four heteroatoms each selected from the group consisting of non-peroxide oxygen, sulfur, and N(Y) where Y is absent or is H, O, (C$_{1-4}$)alkyl, phenyl or benzyl, and optionally containing 1-3 double bonds and optionally substituted with one or more substituents. Examples of heterocyclic ring include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH-carbazolyl, carbolinyl, chromanyl, chromenyl, cinnolinyl, decahydroquinolinyl, 2H,6H-1,5,2-dithiazinyl, dihydrofuro[2,3-b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl.

"Heteroaryl", as used herein, refers to a monocyclic aromatic ring containing five or six ring atoms consisting of carbon and 1, 2, 3, or 4 heteroatoms each selected from the group consisting of non-peroxide oxygen, sulfur, and N(Y) where Y is absent or is H, O, (C$_1$-C$_8$)alkyl, phenyl or benzyl. Non-limiting examples of heteroaryl groups include furyl, imidazolyl, triazolyl, triazinyl, oxazoyl, isoxazoyl, thiazolyl, isothiazoyl, pyrazolyl, pyrrolyl, pyrazinyl, tetrazolyl, pyridyl, (or its N-oxide), thienyl, pyrimidinyl (or its N-oxide), indolyl, isoquinolyl (or its N-oxide), quinolyl (or its N-oxide) and the like. The term "heteroaryl" can include radicals of an ortho-fused bicyclic heterocycle of about eight to ten ring atoms derived therefrom, particularly a benz-derivative or one derived by fusing a propylene, trimethylene, or tetramethylene diradical thereto. Examples of heteroaryl can be furyl, imidazolyl, triazolyl, triazinyl, oxazoyl, isoxazoyl, thiazolyl, isothiazoyl, pyraxolyl, pyrrolyl, pyrazinyl, tetrazolyl, pyridyl (or its N-oxide), thientyl, pyrimidinyl (or its N-oxide), indolyl, isoquinolyl (or its N-oxide), quinolyl (or its N-oxide), and the like.

"Halogen", as used herein, refers to fluorine, chlorine, bromine, or iodine.

The terms "alkenyl" and "alkynyl" refer to unsaturated aliphatic groups analogous in length and possible substitution to the alkyls described above, but that contain at least one double or triple bond respectively.

The terms ortho, meta and para apply to 1,2-, 1,3- and 1,4-disubstituted benzenes, respectively. For example, the names 1,2-dimethylbenzene and ortho-dimethylbenzene are synonymous.

"Substituted", as used herein, means that the functional group contains one or more substituents attached thereon including, but not limited to, hydrogen, halogen, cyano, alkoxyl, alkyl, alkenyl, cycloalkyl, cycloalkenyl, aryl, heterocycloalkyl, heteroaryl, amine, hydroxyl, oxo, formyl, acyl, carboxylic acid (—COOH), —C(O)R', —C(O)OR', carboxylate (—COO—), primary amide (e.g., —CONH$_2$), secondary amide (e.g., —CONHR'), —C(O)NR'R", —NR'R", —NR'S(O)$_2$R", —NR'C(O)R", —S(O)$_2$R", —SR', and —S(O)$_2$NR'R", sulfinyl group (e.g., —SOR'), and sulfonyl group (e.g., —SOOR'); where R' and R" may each independently be hydrogen, alkyl, alkenyl, alkynyl, cycloalkyl, aryl, heterocycloalkyl and heteroaryl; where each of R' and R" is optionally independently substituted with one or more substituents selected from the group consisting of halogen, hydroxyl, oxo, cyano, nitro, amino, alkylamino, dialkylamino, alkyl optionally substituted with one or more halogen or alkoxy or aryloxy, aryl optionally substituted with one or more halogen or alkoxy or alkyl or trihaloalkyl, heterocycloalkyl optionally substituted with aryl or heteroaryl or oxo or alkyl optionally substituted with hydroxyl, cycloalkyl optionally substituted with hydroxyl, heteroaryl optionally substituted with one or more halogen or alkoxy or alkyl or trihaloalkyl, haloalkyl, hydroxyalkyl, carboxy, alkoxy, aryloxy, alkoxycarbonyl, aminocarbonyl, alkylaminocarbonyl and dialkylaminocarbonyl, or combinations thereof. In some instances, "substituted" also refers to one or more substitutions of one or more of the carbon atoms in a carbon chain (i.e., alkyl, alkenyl, cycloalkyl, cycloalkenyl, and aryl groups) which can be substituted by a heteroatom, such as, but not limited to, a nitrogen or oxygen.

"Rubber," or "Elastomer," as used herein, refer to a crosslinked network polymer, which has viscoelastic properties.

As used herein, the term "network" refers to a three dimensional substance having oligomeric and/or polymeric strands interconnected to one another by crosslinks.

As used herein, the term "prepolymer" refers to oligomeric or polymeric strands which have not undergone crosslinking to form a network.

As used herein, the term "crosslink" refers to a connection between two strands. The crosslink may either be a chemical bond, a single atom, or multiple atoms. The crosslink may be formed by reaction of a pendant group in one strand with the backbone of a different strand, or by reaction of one pendant group with another pendant group. Crosslinks may exist between separate strand molecules, and may also exist between different points of the same strand.

"Curable," as used herein, refers polymeric or oligomeric materials or compositions thereof capable of being toughened or hardened typically by crosslinking of polymer and/or oligomer chains therein. "Curing," as used herein refers to the process of applying an external stimulus, such as, but not limited to, light, radiation, electron beams, heat, chemical additives, and combinations thereof which induce crosslinking to produce toughening or hardening of the materials.

The term "biocompatible", as used herein, is intended to describe materials that do not elicit a substantial detrimental response in vivo.

As used herein, "biodegradable" polymers are polymers that degrade to oligomeric and/or monomeric species under physiological or endosomal conditions. In various preferred embodiments, the polymers and polymer biodegradation byproducts are biocompatible. Biodegradable polymers are not necessarily hydrolytically degradable and may require enzymatic action to fully degrade.

"Catalysts" or "Catalytic centers," as used herein, refer to a molecular species or component thereof which lowers the activation energy of chemical reactions and is generally not destroyed or consumed by the chemical reaction and is or can be regenerated. Catalysts are often used to increase rates or yields of chemical reactions and may offer significant economic, efficiency and energy advantages to individuals or businesses that carry out these reactions.

"Viscosity," as used herein refers to the resistance of a substance (typically a liquid) to flow. Viscosity is related to the concept of shear force; it can be understood as the effect of different layers of the fluid exerting shearing force on each other, or on other surfaces, as they move against each other. There are several measures of viscosity. The units of viscosity are $Ns/m^2$, known as Pascal-seconds (Pa-s). Viscosity can be "kinematic" or "absolute". Kinematic viscosity is a measure of the rate at which momentum is transferred through a fluid. It is measured in Stokes (St). The kinematic viscosity is a measure of the resistive flow of a fluid under the influence of gravity. When two fluids of equal volume and differing viscosity are placed in identical capillary viscometers and allowed to flow by gravity, the more viscous fluid takes longer than the less viscous fluid to flow through the capillary. If, for example, one fluid takes 200 s to complete its flow and another fluid takes 400 s, the second fluid is called twice as viscous as the first on a kinematic viscosity scale. The dimension of kinematic viscosity is $length^2/time$. Commonly, kinematic viscosity is expressed in centiStokes (cSt). The SI unit of kinematic viscosity is $mm^2/s$, which is equal to 1 cSt. The "absolute viscosity", sometimes called "dynamic viscosity" or "simple viscosity", is the product of kinematic viscosity and fluid density. Absolute viscosity is expressed in units of centipoise (cP). The SI unit of absolute viscosity is the milliPascal-second (mPa-s), where 1 cP=1 mPa-s. Viscosity may be measured by using, for example, a viscometer at a given shear rate. Additionally, viscosity may be measured by using, for example, a viscometer at multiple given shear rates. A "zero-shear" viscosity can then be extrapolated by creating a best fit line of the four highest-shear points on a plot of dynamic viscosity versus shear rate, and linearly extrapolating viscosity back to zero shear. Alternatively, for a Newtonian fluid, viscosity can be determined by averaging viscosity values at multiple shear rates. Viscosity can also be measured using a microfluidic viscometer at single or multiple shear rates (also called flow rates), wherein absolute viscosity is derived from a change in pressure as a liquid flows through a channel. Viscosity equals shear stress over shear rate. Viscosities measured with microfluidic viscometers can, in some embodiments, be directly compared to zero-shear viscosities, for example those extrapolated from viscosities measured at multiple shear rates using a cone and plate viscometer.

The term "jettable", as generally used herein, refers to curable suitable for 3-dimensional inkjet printing applications.

As used herein, the terms "oligomer" and "polymers" each refer to a compound of a repeating monomeric subunit. Generally speaking, an "oligomer" contains fewer monomeric units than a "polymer." Those of skill in the art will appreciate that whether a particular compound is designated an oligomer or polymer is dependent on both the identity of the compound and the context in which it is used.

One of ordinary skill will appreciate that many oligomeric and polymeric compounds are composed of a plurality of compounds having differing numbers of monomers. Such mixtures are often designated by the average molecular weight of the oligomeric or polymeric compounds in the mixture. As used herein, the use of the singular "compound" in reference to an oligomeric or polymeric compound includes such mixtures.

As used herein, reference to any oligomeric or polymeric material without further modifiers includes oligomeric or polymeric material having any average molecular weight.

"Mean particle size," or "Average particle size," as used herein, generally refers to the statistical mean particle size (diameter) of the particles in a population of particles. The diameter of an essentially spherical particle may be referred to as the physical or hydrodynamic diameter. The diameter of a non-spherical particle may refer preferentially to the hydrodynamic diameter. As used herein, the diameter of a non-spherical particle may refer to the largest linear distance between two points on the surface of the particle. Mean particle size can be measured using methods known in the art, such as dynamic light scattering.

Numerical ranges include, but are not limited to, ranges of temperatures, ranges of pressures, ranges of molecular weights, ranges of integers, ranges of force values, ranges of times, ranges of thicknesses, and ranges of gas flow rates. The disclosed ranges include values that such a range could reasonably encompass, as well as sub-ranges and combinations of sub-ranges encompassed therein. For example, disclosure of a temperature range is intended to disclose individually possible temperature values that such a range could encompass, consistent with the disclosure herein. In another example, the disclosure that an annealing step may be carried out for a period of time in the range of about 5 min to 30 min, also refers to time values that can be selected independently from about 5, 6, 7, 8, 9, 10, 11, 12, 13, 14, 15, 16, 17, 18, 19, 20, 21, 22, 23, 24, 25, 26, 27, 28, 29, and 30 minutes, as well as any range between these numbers (for example, 10 min to 20 min), and any possible combination of ranges between these time values.

The term "about" or "approximately" as used herein generally means within 20%, preferably within 10%, and more preferably within 5% of a given value or range. The term "about x" further includes x.

II. Curable Formulations

In embodiments described herein, curable formulations of monomeric and/or oligomeric precursors are formed via chemistries that enable desirable material performance and tunable physical and thermomechanical properties to be obtained. Desirable material performance and tunable physical and thermomechanical properties include, but are not limited to, high toughness, optical clarity, high tensile strength, good solvent resistance, good thermal resistance, tunable modulus, viscosity, tunable glass transition temperature, tunable cure time, and tunable surface adhesion. According to the embodiments described herein, materials, composites, and other compositions thereof can be formed from the curable formulations.

The curable formulations include monomeric and/or oligomeric precursors. The monomeric and/or oligomeric precursors contain one or more reactive functional groups, where the one or more reactive functional groups can vary from n=1 to n=50, or greater, depending on the monomeric and/or oligomeric precursors. The curable formulations formed from monomeric and/or oligomeric precursors can be tuned, for example, by varying the degree of functionalization with one or more reactive functional groups used to prepare the precursors and formulations thereof.

In some embodiments, the properties of the precursors can be tuned via the inclusion of one or more moieties, such as cyclic aliphatic linkages/linker groups for toughness, rigidity, UV resistance and thermal resistance; sterically hindered moieties and/or substituents, which can inhibit/control macromolecular alignment to afford amorphous materials, composites, and other compositions thereof upon polymerization and which can afford high optical clarity.

In certain embodiments, the precursors of the formulation or mixture include moieties and/or substituents that can form or contain linkages, such as urethane, amide, thiourethane and dithiourethane groups which allow for inter-chain hydrogen bonding and can be used to impart increased toughness and rigidity. In yet other embodiments, the selective incorporation of ester, beta-aminoester, carbonate, silyl ether linkages, or linker groups in the precursors can be used to control environmental degradation time and solvent uptake, which can also be tuned by incorporating pendant hydrophilic or hydrophobic groups into material compositions.

The precursors of the curable formulations can be prepared, for example, from mercapto, alkene, (meth)acrylate, alkyne, amine and epoxy functionalized monomeric and oligomeric constituents, or combinations thereof. The stoichiometric ratios of monomeric and/or oligomeric precursors present in the curable formulations can be within the range from about 1.00:4.00, about 1.00:3.00, about 1.00:2.20, about 1.00:2.00, about 1.00:1.00, about 1.00:0.97, about 1.00:0.95, about 1.00:0.90, about 1.00:0.50, about 1.00:0.33, about 1.00:0.25, and about 1.00:0.20.

The curable formulations formed of monomeric and/or oligomeric precursors can be cured by applying ultraviolent (UV) light, heat, acid or base catalyzed curing processes, or combinations thereof. The cured formulations are then subjected to performance characterization analysis and can be utilized, for example, in known additive manufacturing processes, such as stereolithography additive applications, and for coatings applications.

Varying quantities of initiators or catalysts can be added to the formulations to catalyze addition reactions, between the monomeric and/or oligomeric precursors, prior to or during the application of an optional thermal aging process. Exemplary addition reactions include, but are not limited to, free radical initiated thiol-ene, base catalyzed Michael Addition and base catalyzed thiol-epoxy addition reactions.

For curable formulations designed to be UV curable, a photoinitiator can also be added. For example, a free radical inhibitor can be added to acrylate containing formulations and select thiol-ene formulations. Exemplary photoinitiators include, but are not limited to, 2,2-dimethoxy-2-phenylacetophenone (DMPA) and diphenyl(2,4,6-trimethylbenzoyl) phosphine oxide (TPO). The amount of photoinitiator which can be added to form UV curable formulations can be within the range from about 0.001 wt % to 10 wt %. In some embodiments, the amount of photoinitiator added to the curable formulations can be about 0.10 wt %, 0.20 wt %, 0.30 wt %, 0.40 wt %, 0.50 wt %, 1.00 wt %, 1.50 wt %, 2.00 wt %, 2.50 wt %, 3.00 wt %, 3.50 wt %, 4.00 wt %, 4.50 wt %, and 5.00 wt %. In some embodiments, free radical inhibitors (which include, but are not limited to, 4-methoxyphenol and 1,4-hydroquinone) can be added to the curable formulations to a concentration in a range from 0.01 to 2000 ppm. In some embodiments, the concentration of free radical inhibitors added can be about 500 ppm, about 1000 ppm, or about 1500 ppm.

For curable formulations designed to be thermally curable, such as thiol-epoxy-based formulations, thermal free-radical initiators or tertiary amine catalysts can be added to catalyze curing. Exemplary thermal free-radical initiators include, but are not limited to, benzoyl peroxide (BPO) and azobisisobutyronitrile (AIBN). Thermal free radical initiators catalyze radical initiated addition reactions, such as during a thermal aging process, and the amounts added to the curable formulations can be within the range from about 0.001 wt % to 10 wt %. In some embodiments, the amount of thermal free radical initiator added to the curable formulations can be about 0.10 wt %, 0.20 wt %, 0.30 wt %, 0.40 wt %, 0.50 wt %, 1.00 wt %, 1.50 wt %, 2.00 wt %, 2.50 wt %, 3.00 wt %, 3.50 wt %, 4.00 wt %, 4.50 wt %, or 5.00 wt %. Tertiary amine base catalysts can be used catalyze, for example, Michael Addition and/or thiol-epoxy reactions or related reactions, during thermal aging. The amounts of tertiary amine base catalyst(s) that can added to the curable formulations can be in the range from about 0.01 wt % to 10 wt %. In some embodiments, the amount of tertiary amine base catalyst(s) which can be added to the curable formulations can be about 0.10 wt %, 0.20 wt %, 0.30 wt %, 0.40 wt %, 0.50 wt %, 1.00 wt %, 1.50 wt %, 2.00 wt %, 2.50 wt %, 3.00 wt %, 3.50 wt %, 4.00 wt %, 4.50 wt %, or 5.00 wt %.

Curing reactions can be used to fully cure or a substantially cure the formulations, wherein substantially refers to a percentage of crosslinking of at least about 80%, 85%, 90%, 91%, 92%, 93%, 94%, 95%, 96%, 97%, 98%, or 99%.

In certain embodiments, the curable formulations are designed to be chemically curable using one or more chemical catalysts, such as acid or base catalysts, to cure the curable formulation over a period of time. The one or more chemical catalysts can be added at concentrations of about 0.10 wt %, 0.20 wt %, 0.30 wt %, 0.40 wt %, 0.50 wt %, 1.00 wt %, 1.50 wt %, 2.00 wt %, 2.50 wt %, 3.00 wt %, 3.50 wt %, 4.00 wt %, 4.50 wt %, or 5.00 wt %. The time needed to achieve full curing will be dependent on the concentration of catalyst added and the nature of the crosslinking reaction chemistries occurring in the formulation on standing. In certain instances, such processes can be driven by applying heat to the formulation.

Ceramic fillers can optionally be added to the formulations following a thermal aging process. Examples include Cabot CAB-O-SIL TS-720, TS-610, TS-622, TS-530, EVONIK AEROSIL R8200, R106, R812S, R202, R208, R972, R974, R812S. In some embodiments, the amount of ceramic filler(s) added can be in the range of about 0.001 to 20.00 wt %. In some embodiments, the amount of ceramic filler(s) is about 0.50 wt %, 1.00 wt %, 1.50 wt %, 2.00 wt %, 2.50 wt %, 3.00 wt %, 3.50 wt %, 4.00 wt %, 4.50 wt %, 5.00 wt %, 6.00 wt %, 7.00 wt %, 8.00 wt %, 9.00 wt %, or 10.00 wt %. Exemplary fumed silica additives include silica additives having an average particle size in the range of about 5 to 500 $m^2/g$. In some embodiments, the fumed silica additives have an average particle size of about 50 $m^2/g$, 75 $m^2/g$, 100 $m^2/g$, 120 $m^2/g$, 150 $m^2/g$, 200 $m^2/g$, 250 $m^2/g$, 300 $m^2/g$, or 350 $m^2/g$.

Silanes can also be added to improve glass adhesion and adhesion to metals that include copper, zinc, iron, stainless steel, and aluminum. Examples include .vinylsilanes, mercaptosilanes, aminosilanes, methacrylosilanes added in 0.01 to 15 mole % equivalents to claimed formulations. Specific products: Evonik Dynasylan MTMO, AMMO, VTMO and Evonik (meth)acrylated silanes.

Modifiers can be added to the curable formulations before or after applying a curing and/or thermal aging processing step in order to modify physical properties and/or curing profiles of the uncured formulations, as well as the physical or thermomechanical properties of cured formulations thereof. Exemplary modifiers include, but are not limited to, trimethylolpropane tris(3-mercaptopropionate), pentaerithritol tetrakis(3-mercaptopropionate), dipentaerithritol hexakis(3-mercaptopropionate), tris[2-(3-mercaptopropionyloxy)ethyl]isocyanurate, tetraethylene glycol bis(3-mercaptopropionate), 1,10-decanedithiol, ethylene glycol bis(3-mercaptopropionate), 1,2-ethanedithiol, 1,3-propanedithiol, 1,4-butanedithiol, 1,6-hexanedithiol, 1,8-octanedithiol, 2-mercaptoethanol, 2-hydroxyethylacrylate, 2-carboxyethylacrylate, acrylic acid, thioglycolic acid, iso-tridecyl 3-mercaptopropionate, sodium thioglycolate, butyl glycidyl ether, 2-ethylhexyl glycidyl ether, limonene oxide, limonene dioxide, dicyclopentadiene dioxide, castor oil glycidyl ether, 2-amino-2-methyl-1-propanol, vinyl cyclohexene oxide, allyl isothiocyanate, isophorone diisocyanate, bisphenol A ethoxylate diacrylate, bisphenol A ethoxylate diglycidyl ether, ethoxylated trimethylolpropane tris(3-mercaptopropionate), pentaerithritol tetrakis(polycaprolactone, mercaptopropionate terminated), polydimethylsiloxane, diglycidyl ether terminated, $M_n$ 800, glycerol diacrylate, glycerol triacrylate, and allyl glycidyl ether. In some embodiments, modifiers include sand, polymer powders, hydroxyapatite nanopowder, tungsten powder, metal powders, and ceramic powders.

In some embodiments, following a thermal aging step, the formulations can be stored without degradation or without substantial degradation (i.e., less than about 20%, 15%, 10%, 9%, 8%, 7%, 6%, 5%, 4%, 3%, 2%, or 1% change in the any one or more properties of the material, as determined by known testing methods) over a period of time of about 1 day, to 5 days, to 10 days, to 20 days, to 30 days, to two months, three months, four months, five months, six months, one year, two years, three years, four years, five years, or longer.

In some embodiments, during or following a thermal aging step, the formulations can be mixed with one or more other curable formulations as described herein. In yet some other embodiments, during or following a thermal aging step the formulations can be mixed with one or more modifiers as described herein.

In some embodiments, combinations of one or more curable formulations with a cured material can be used to afford tunable viscosity, toughness, good biocompatibility, tunable biodegradation time in multiple environments, unique and differentiating adhesion capabilities to selected substrate surfaces, advanced material capabilities, including but not limited to, shape memory and UV resistance.

In some embodiments, combinations of one or more curable formulations and a modifier material can be used to afford tunable viscosity, toughness, good biocompatibility, tunable biodegradation time in multiple environments, unique and differentiating adhesion capabilities to selected substrate surfaces, advanced material capabilities, including but not limited to, shape memory and UV resistance.

In certain embodiments, the curable formulations have a viscosity between about 1.0 and 100.0 cP at about 20-25° C. In certain embodiments, the cured formulations alone or as composites further containing one or more modifiers have a viscosity between about 10 and 100.0 cP at about 20-25° C.

In certain embodiments, the cured formulations alone or as composites thereof demonstrate stable viscosities that do not increase after about 1 day, 5 days, 10 days, 20 days, 30 days, 40 days, 60 days, 70 days, 80 days, 90 days, 100 days, or longer when stored at or near room temperature, optionally in light free conditions. In certain other embodiments, the cured formulations alone or as composites thereof demonstrate stable viscosities that do not increase when exposed to elevated temperatures of about 30° C. to 50° C., 30° C. to 60° C., 30° C. to 70° C., 30° C. to 80° C., 30° C. to 90° C., 30° C. to 100° C., or 30° C. to 150° C. for periods of time of between 0.1 hours to 100 hours.

In certain embodiments, the curable formulations or cured formulations therefrom, alone, as mixtures with other formulations, or containing one or more modifiers are characterized by a Young's modulus between 0.01 and 500.00 $N/mm^2$, preferably between 0.01 and 100.00 $N/mm^2$, more preferably between 0.01 and 50.00 $N/mm^2$, even more preferably between 0.01 and 10.00 $N/mm^2$, and especially preferably between 0.01 and 5.00 $N/mm^2$. The Young's Modulus can be evaluated through mechanical testing such as compressive or tensile testing. The Young's Modulus can be evaluated using an Instron in tensile mode with uniaxial loading, testing a cast necked or dog-bone shaped sample. The Young's Modulus is evaluated by calculating the gradient of the linear region of the Stress-Strain graph, where Young's Modulus $E=\sigma/\varepsilon$.

In certain embodiments, the curable formulations or cured formulations, alone, as mixtures with other formulations, or containing one or more modifiers are characterized by a tensile strength between 0.01 and 5.00 $N/mm^2$. The tensile strength of a dynamic network material may be determined by measuring the force required to break a material extended in a unilateral direction by using an instrument such as an instron to calculate force required to break a standardized shape such as a dogbone shaped material.

In certain embodiments, the dynamic network material is characterized by a crosslinking density between 1 and 75 $mol/m^3$. The crosslinking density of a dynamic network material may be determined by using the formula $n=E/3RT$, where E is the Young's Modulus evaluated from the tensile test, R is the ideal gas constant and T is temperature (298 K). In certain preferred embodiments, the dynamic network material is characterized by a crosslinking density between 5-70 $mol/m^3$, preferably, between 5-40 $mol/m^3$, and even more preferably between 5-20 $mol/m^3$. In other embodiments, the crosslinking density is between 1-15 $mol/m^3$, preferably between 3-10 $mol/m^3$, and especially preferably between 5-10 $mol/m^3$. In other embodiments, the crosslinking density is between 10-75 $mol/m^3$, preferably between 10-65 $mol/m^3$, even more preferably between 20-60 $mol/m^3$ and especially preferably between 30-50 $mol/m^3$.

In some embodiments, the monomeric and/or oligomeric precursors include polythiols which are formed, at least in part, from a reaction between C=C-containing compound (s) and SH-containing compounds. Such reactions are often UV catalyzed but can also proceed under elevated temperature conditions, is highly efficient, tolerant of many functional groups, and capable of proceeding under mild conditions. (D. P. Nair, N. B. Cramer, T. F. Scott, C. N. Bowman, R. Shandas, Polymer, 2010, 51, 4383).

For example, the curable formulations can include one or more polythiol constituents obtained from mercaptan-containing terpenes (such as D-Limonene and/or L-Limonene, and/or derivatives or analogs thereof) and/or terpenoids. Exemplary polythiols derived from terpenes or terpenoids include, but are not limited to, dipentene dimercaptan, isoprene dimercaptan, farnesene dimercaptan, farnesene trimercaptan, farnesene tetramercaptan, myrcene dimercaptan, myrcene trimercaptan, bisabolene dimercaptan, bisabolene trimercaptan, linalool dimercaptan, terpinolene dimercaptan, terpinene dimercaptan, geraniol dimercapan, citral dimercaptan, retinol dimercaptan, retinol trimercaptan, retinol tetramercaptan, beta-carotene polymercaptans, or combinations thereof. In some embodiments, the polythiols are derived from trimethylolpropane trithiol, pentaerithriol trithiol, pentaerithritol tetrathiol, inositol di-, tri-, tetra-, penta- and hexathiols.

In yet other embodiments, the curable formulations can include one or more olythiol constituents obtained from mercaptan-containing cyclic, polycyclic, or linear aliphatic polyalkenes or alkynes. Exemplary polythiols derived from these groups include, but are not limited to, trivinylcyclohexene dimercaptan, trivinylcyclohexene trimercaptan, dicyclopentadiene dimercaptan, vinylcyclohexene dimercaptan, triallylisocyanurate dimercaptan, triallyl isocyanurate trimercaptan, phenylhepta-1,3,5-triyne polmer-captans, 2-butyne-1,4-diol dimercaptan, propargyl alcohol dimercaptan, dipropargyl sulfide polymercaptans, dipropargyl ether polymercaptans, propargylamine dimercaptan, dipropargylamine polymercaptans, tripropargylamine polymercaptans, tripropargyl isocyanurate polymercaptans, tripropargyl cyanurate polymercaptans.

In other embodiments, the curable formulations can include one or more polythiol constituents obtained from mercaptan-containing, unsaturated fatty acids or unsaturated fatty esters. Exemplary polythiols derived from these groups include, but are not limited to, arachidonic acid dimercaptan, arachidonic acid trimercaptan, arachidonic acid tetramercaptan, eleostearic acid dimercaptan, eleostearic acid trimercaptan, linoleic acid dimercaptan, linolenic acid dimercaptan, linolenic acid trimercaptan, mercaptanized linseed oil, mercaptanized tung oil, mercaptanized soybean oil, mercaptanized peanut oil, mercaptanized walnut oil, mercaptanized avocado oil, mercaptanized sunflower oil, mercaptanized corn oil, mercaptanized cottonseed oil.

The curable formulations can also include one or more alkene constituents such as, but not limited to, terpenes, terpenoids, dimerized terpenes or terpenoids, trimerized terpenes or terpenoids, oligomeric terpenes or terpenoids, polymerized terpenes or terpenoids, limonene, D-limonene, L-limonene, poly(limonene) having "n" repeat units wherein "n" is greater than n=2 and less than 500,000, farnesene, myrcene, bisabolene, linalool, terpinolene, terpinene, geraniol, citral, retinol, beta-carotene, triallyl isocyanurate, 1,2,4-trivinyl cyclohexane, norbornene functionalized poly(terpene) oligomers, norbornene-functionalized polydimethylsiloxane, norbornene-functionalized poly (butadiene), norbornene-functionalized polyisoprene oligomers, poly(isoprene) with having "n" repeat units wherein "n" is 2 or more and less than 500,000, poly(butadiene) having "n" repeat units wherein "n" is 2 or more and less than 500,000, divinyl ether, triallylamine, diallylamine, diallyl bisphenol A, cyclohexanedimethanol diallyl ether, pentaerithritol tetraallyl ether, trimethylolpropane triallyl ether, 2,4,6-Triallyloxy-1,3,5-triazine, inositol diallyl ether, inositol triallyl ether, inositol tetraallyl ether, inositol pentaallyl ether, inositol hexaallyl ether, inositol divinyl ether, inositol trivinyl ether, inositol tetravinyl ether, inositol pentavinyl ether, inositol hexavinyl ether, triallyl citrate, trivinyl citrate, 1,5-cyclooctadiene, 1,3-cyclooxtadiene, 1,4-cyclooctadiene, 1,3-6 cyclooctatriene, cyclohexane diallyl ether, cyclohexane triallyl ether, cyclohexane tetraallyl ether, cyclohexane pentaallyl ether, cyclohexane hexaallyl ether, cyclohexane divinyl ether, cyclohexane trivinyl ether, cyclohexane tetravinyl ether, cyclohexane pentavinyl ether, cyclohexane hexavinyl ether, diclyclopentadiene, tricyclodecane dimethanol divinyl ether, tricyclodecane dimethanol diallyl ether, tricyclodecane dimethanol, norbornene capped, bicyclo[2.2.1]hepta-2,5-diene, norbornene-functionlized polyamide oligomers having "n" repeat units wherein "n" is 2 or more polyamide repeat units and less than 100,000 repeat units, allyl ether-functionlized polyamide oligomers having "n" repeat units wherein "n" is 2 or more polyamide repeat units and less than 100,000 repeat units, vinyl ether-functionalized polyamide oligomers having "n" repeat units wherein "n" is 2 or more polyamide repeat units and less than 100,000 repeat units, norbornene-functionlized polydimethylsiloxane having "n" repeat units wherein "n" is 2 or repeat units and less than 100,000 repeat units, allyl ether-functionlized polydimethylsiloxane having "n" repeat units wherein "n" is 2 or repeat units and less than 100,000 repeat units, vinyl ether-functionlized polydimethylsiloxane having "n" repeat units wherein "n" is 2 or repeat units and less than 100,000 repeat units, resorcinol diallyl ether, resorcinol divinyl ether, diallylamine, triallylamine, or allylamine.

The curable formulations can also include one or more acrylate or methacrylate-based constituents such as, but not limited to, neopentyl glycol diacrylate, glycerol diacrylate, glycerol triacrylate, ethylene glycol diacrylate, tetraethylene glycol diacrylate, trimethylolpropane triacrylate, tris[2-(acryloyloxy)ethyl] isocyanurate, pentaerythritol tetraacrylate, pentaerythritol triacrylate, ethoxylated trimethylolpropane triacrylate, ethyoxylated pentaerythritol triacrylate, ethoxylated pentaerythritol tetraacrylate, poly(dimethylsiloxane) diacrylate having "n" repeat units wherein "n" is 2 or more repeat units and less than 500,000 repeat units, poly(isoprene) diacrylate having "n" repeat units wherein "n" is 2 or more repeat units and less than 500,000 repeat units, poly(butadiene-co-nitrile) diacrylate having "n" repeat units wherein "n" is 2 or more butadiene repeat units and 2 or more nitrile repeat units and less than 500,000 butadiene repeat units and less than 500,000 nitrile repeat units, polyethyleneglycol diacrylate having "n" repeat units wherein "n" is greater than 2 repeat units and less than 500,000 repeat units, tricyclodecantedimethanol diacrylate, bisphenol A diacrylate, ethoxylated bisphenol A diacrylate having "n" repeat units wherein "n" is greater than 2 repeat units and less than 500,000 repeat units, and methacrylated equivalents thereof of the above listed constituents.

The curable formulations can also include one or more epoxy-based constituents such as, but not limited to, epoxidized terpenes or terpenoids, epoxidized dimerized terpenes or terpenoids, epoxidized trimerized terpenes or terpenoids, epoxidized oligomeric terpenes or terpenoids or polymerized terpenes or terpenoids, limonene oxide, limonene dioxide, poly(limonene oxide) having "n" repeat units wherein "n" is 2 or more repeat units and less than 500,000 repeat units, poly(isoprene oxide)-co-polyisoprene copolymers having "n" repeat units wherein "n" is 2 or more repeat units and less than 500,000 repeat units, poly(butadiene oxide)-co-polybutadiene copolymers having "n" repeat units wherein "n" is 2 or more repeat units and less than 500,000 repeat units, epoxidized farnesene, epoxidized farnesene, epoxidized myrcene, epoxidized bisabolene, epoxidized linalool, epoxidized terpinolene, epoxidized terpinene, epoxidized geraniol, epoxidized citral, epoxidized retinol, epoxidized beta-carotene, epoxidized arachidonic acid, epoxidized eleostearic acid epoxidized linoleic acid, epoxidized linolenic acid, epoxidized linseed oil, epoxidized tung oil, epoxidized soybean oil, epoxidized peanut oil, epoxidized walnut oil, epoxidized avocado oil, epoxidized sunflower oil, epoxidized corn oil, epoxidized cottonseed oil, epoxidized palm oil, epoxidized glycerol, including glycerol diglycidyl ether and glycerol triglycidyl ether, epoxidized sorbitol, including sorbitol diglycidyl ether, sorbitol triglycidyl ether, sorbitol tetraglycidyl ether, sorbitol pentaglycidyl ether and sorbitol hexaglycidyl ether, cyclohexanedimethanol diglycidyl ether, resorcinol diglycidyl ether, bisphenol A diglycidyl ether, hydrogenated bisphenol A diglycidyl ether, neopentyl glycol diglycidyl ether, ethylene glycol diglycidyl ether, 1,4-butanediol diglycidyl ether, tetraethylene glycol diglycidyl ether, polydimethylsiloxane diglycidyl ether, epoxidized butadiene oligomers, epoxidized butadiene-co-polynitrile oligomers, epoxidized grapefruit mercaptan, ethoxylated bisphenol A diglycidyl ether having "n" repeat units wherein "n" is 2 or more repeat units and less than 500,000 repeat units, ethoxylated hydrogenated bisphenol A diglycidyl ether having "n" repeat units wherein "n" is 2 or more repeat units and less than 500,000 repeat units, ethoxylated cyclohexanedimethanol diglycidyl ether having "n" repeat units wherein "n" is 2 or more repeat units and less than 500,000 repeat units.

The curable formulations can also include one or more alkyne-based constituents such as, but not limited to, acetylene, supercritical acetylene, propargyl alcohol, 2-butyne-1,4-diol, phenylhepta-1,3,5-triyne, dipropargyl sulfide, dipropargyl ether, propargylamine, dipropargylamine, tripropargylamine, tripropargyl isocyanurate, tripropargyl cyanurate, propargyl inositol, dipropargyl inositol, tripropargyl inositol, tetrapropargyl inositol, pentapropargyl inositol, hexapropargyl inositol, dipropargylpiperazine, dipropargyl citrate, tripropargyl citrate, cyclohexanedimethanol propargyl ether, cyclohexanedimethanol dipropargyl ether, quinic acid lactone propargyl ether, quinic acid lactone dipropargyl ether, quinic acid lactone tripropargyl ether, tricyclodecanedimethanol propargyl ether, tricyclodecanedimethanol dipropargyl ether, bisphenol A bis(propargyl ether), hydrogenated bisphenol A bis(propargyl ether), cyclohexane dipropargyl ether, cyclohexane tripropargyl ether, cyclohexane tetrapropargyl ether, cyclohexane pentapropargyl ether, cyclohexane hexapropargyl ether, propargyl resorcinol, dipropargyl resorcinol.

In certain embodiments, the curable formulations once cured can have unreacted, partially reacted, or fully reacted functional groups/substituents present therein. Exemplary functional groups include, but are not limited to, thiol, alkene, alkyne, hydroxyl, carboxylic acid, acrylate, isocyanate, isothiocyanate, amine, epoxy, diene/dienophile, alkyl halide, carboxylic acid anhydride, aldehyde and phenol groups.

III. Methods of Making Curable and Cured Formulations

Methods for Making the Curable Formulations, Cured Formulations thereof, and other composites thereof are described herein. In some embodiments, the methods are low waste methods which generally do not require any or any significant purification of the formulations, composites, or reaction products therein. The curable or cured formulations, composites, and other compositions thereof formed from the precursors as described above and as shown in the examples generally proceed in additive "one pot" steps. In some embodiments, these methods do not require the presence of any added solvents. In certain other embodiments, the methods of making the formulations include use of one or more aqueous or organic solvents, or combinations thereof which can be removed, as needed.

In certain embodiments of the methods, a variety of building block precursors, as described above and in the examples, can be derived from renewable feedstocks, and these building blocks have reactive groups, such as, but not limited to thiols, amines, that allow them to undergo addition reactions with reactive groups, such as C=C, present in other building blocks under appropriate reaction conditions. Such chemistries include, but are not limited to, thiol-ene/thiol-yne/thiol-acrylate thermally induced free radical addition chemistry, which can be used to build molecular weight between thiol- and alkene/acrylate/alkyne-functionalized and epoxy-containing constituents. In certain embodiments, the reactions described herein can include an initiator, such as, but not limited to, a thermal free radical initiator, such as AIBN, or a photoinitiator such as DMPA, which can be used in the presence of heat/UV to produce monomers, oligomers or polymers which will not or are not cured products and will remain stable until additional reagents are added to induce curing. Curing reactions can be used to form a fully crosslinked network polymer or a substantially crosslinked network polymer, wherein substantially refers to a percentage of crosslinking of at least about 80%, 85%, 90%, 91%, 92%, 93%, 94%, 95%, 96%, 97%, 98%, or 99%. In other embodiments, base catalyzed thiol-epoxy, thiol-acrylate, amine-epoxy and other similar reactions can afford alternative routes to constructing monomers/oligomers/polymers as described herein. Other chemistries which can also be used to construct monomers/oligomers/polymers before curing include, but are not limited to, acrylate-amine and thiol-acrylate Michael Additions and isocyanate and isothiocyanate reactions with hydroxyl, thiol, amine and other related groups.

A non-limiting method of making a curable formulation includes the steps of:
(a) mixing a polythiol constituent; an alkene-containing and/or alkyne-containing constituent; and an epoxy-containing constituent, wherein the polythiol comprises at least three thiol groups; and
(b) thermally aging the mixture.

In some embodiments, the polythiol constituent is derived from a mercaptan-containing terpene or terpenoid, a mercaptan-containing cyclic alkene, a mercaptan-containing polycyclic alkene, a linear alkene, a mercaptan-containing alkyne, a mercaptan-containing unsaturated fatty acid, a mercaptan-containing unsaturated fatty ester, or a mercaptan-containing polyalkene.

In some other embodiments, the polythiol constituent is derived from trimethylolpropane trithiol, pentaerithritiol trithiol, pentaerithritol tetrathiol, inositol, and dithiols, trithiols, tetrathiols, pentathiols, hexathiols, or combinations thereof.

In some embodiments, the mercaptan-containing terpene or terpenoid is dipentene dimercaptan, isoprene dimercaptan, farnesene dimercaptan, farnesene trimercaptan, farnesene tetramercaptan, myrcene dimercaptan, myrcene trimercaptan, bisabolene dimercaptan, bisabolene trimercaptan, linalool dimercaptan, terpinolene dimercaptan, terpinene dimercaptan, geraniol dimercapan, citral dimercaptan, retinol dimercaptan, retinol trimercaptan, retinol tetramercaptan, beta-carotene polymercaptans, or a combination thereof.

In some embodiments, the mercaptan-containing cyclic alkene, mercaptan-containing polycyclic alkene, or linear aliphatic alkene is trivinylcyclohexene dimercaptan, trivinylcyclohexene trimercaptan, dicyclopentadiene dimercaptan, vinylcyclohexene dimercaptan, triallylisocyanurate dimercaptan, triallyl isocyanurate trimercaptan, or a combination thereof.

In some embodiments, the mercaptan-containing alkyne is phenylhepta-1,3,5-triyne polymercaptans, 2-butyne-1,4-diol dimercaptan, propargyl alcohol dimercaptan, dipropargyl sulfide polymercaptans, dipropargyl ether polymercaptans, propargylamine dimercaptan, dipropargylamine polymercaptans, tripropargylamine polymercaptans, tripropargyl isocyanurate polymercaptans, tripropargyl cyanurate polymercaptans, or a combination thereof.

In some embodiments, the mercaptan-containing fatty acids or fatty acid esters are arachidonic acid dimercaptan, arachidonic acid trimercaptan, arachidonic acid tetramercaptan, eleostearic acid dimercaptan, eleostearic acid trimercaptan, linoleic acid dimercaptan, linolenic acid dimercaptan, linolenic acid trimercaptan, mercaptanized linseed oil, mercaptanized tung oil, mercaptanized soybean oil, mercaptanized peanut oil, mercaptanized walnut oil, mercaptanized avocado oil, mercaptanized sunflower oil, mercaptanized corn oil, mercaptanized cottonseed oil, or a combination thereof.

In some embodiments, the alkene constituent is one or more of terpenes, terpenoids, dimerized terpene, dimerized terpenoids, trimerized terpenes, trimerized terpenoids, oligomeric terpenes or terpenoids, polymerized terpenes, polymerized terpenoids, limonene, D-limonene, L-limonene, poly(limonene), farnesene, myrcene, bisabolene, linalool, terpinolene, terpinene, geraniol, citral, retinol, beta-carotene, triallyl isocyanurate, 1,2,4-trivinyl cyclohexane, norbornene functionalized poly(terpene) oligomers, norbornene-functionalized polydimethylsiloxane, norbornene-functionalized poly(butadiene), norbornene-functionalized polyisoprene oligomers, poly(isoprene), divinyl ether, triallylamine, diallylamine, diallyl bisphenol A, cyclohexanedimethanol diallyl ether, pentaerithritol tetraallyl ether, trimethylolpropane triallyl ether, 2,4,6-triallyloxy-1,3,5-triazine, inositol diallyl ether, inositol triallyl ether, inositol tetraallyl ether, inositol pentaallyl ether, inositol hexaallyl ether, inositol divinyl ether, inositol trivinyl ether, inositol tetravinyl ether, inositol pentavinyl ether, inositol hexavinyl ether, triallyl citrate, trivinyl citrate, 1,5-cyclooctadiene, 1,3-cyclooxtadiene, 1,4-cyclooctadiene, 1,3-6 cyclooctatriene, cyclohexane diallyl ether, cyclohexane triallyl ether, cyclohexane tetraallyl ether, cyclohexane pentaallyl ether, cyclohexane hexaallyl ether, cyclohexane divinyl ether, cyclohexane trivinyl ether, cyclohexane tetravinyl ether, cyclohexane pentavinyl ether, cyclohexane hexavinyl ether, diclyclopentadiene, tricyclodecane dimethanol divinyl ether, tricyclodecane dimethanol diallyl ether, tricyclodecane dimethanol, norbornene capped, bicyclo[2.2.1]hepta-2,5-diene, norbornene-functionlized polyamide oligomers, allyl ether-functionlized polyamide oligomers, vinyl ether-functionalized polyamide oligomers, norbornene-functionlized polydimethylsiloxane, allyl ether-functionlized polydimethylsiloxane, vinyl ether-functionlized polydimethylsiloxane, resorcinol diallyl ether, resorcinol divinyl ether, diallylamine, triallylamine, allylamine, or combinations thereof.

In certain embodiments, the alkene constituent is an acrylate or methacrylate group, wherein the acrylate or methacrylate group is neopentyl glycol diacrylate, glycerol diacrylate, glycerol triacrylate, ethylene glycol diacrylate, tetraethylene glycol diacrylate, trimethylolpropane triacrylate, tris[2-(acryloyloxy)ethyl] isocyanurate, pentaerithritol tetraacrylate, pentaerithritol triacrylate, ethoxylated trimethylolpropane triacrylate, ethyoxylated pentaerithritol triacrylate, ethoxylated pentaerithritol tetraacrylate, poly(dimethylsiloxane) diacrylate, poly(isoprene) diacrylate, poly(butadiene-co-nitrile) diacrylate, polyethyleneglycol diacrylate, tricyclodecanedimethanol diacrylate, bisphenol A diacrylate, ethoxylated bisphenol A diacrylate, or methacrylated equivalents thereof.

In some embodiments, the alkyne constituent is acetylene, propargyl alcohol, 2-butyne-1,4-diol, phenylhepta-1,3,5-triyne, dipropargyl sulfide, dipropargyl ether, propargylamine, dipropargylamine, tripropargylamine, tripropargyl isocyanurate, tripropargyl cyanurate, propargyl inositol, dipropargyl inositol, tripropargyl inositol, tetrapropargyl inositol, pentapropargyl inositol, hexapropargyl inositol, dipropargylpiperazine, dipropargyl citrate, tripropargyl citrate, cyclohexanedimethanol propargyl ether, cyclohexanedimethanol dipropargyl ether, quinic acid lactone propargyl ether, quinic acid lactone dipropargyl ether, quinic acid lactone tripropargyl ether, tricyclodecanedimethanol propargyl ether, tricyclodecanedimethanol dipropargyl ether, bisphenol A bis(propargyl ether), hydrogenated bisphenol A bis (propargyl ether), cyclohexane dipropargyl ether, cyclohexane tripropargyl ether, cyclohexane tetrapropargyl ether, cyclohexane pentapropargyl ether, cyclohexane hexapropargyl ether, propargyl resorcinol, dipropargyl resorcinol, or combinations thereof.

In some embodiments, the epoxy-containing constituent is one or more of epoxidized terpenes, epoxidized terpenoids, epoxidized dimerized terpenes, epoxidized dimerized terpenoids, epoxidized trimerized terpenes, epoxidized trimerized terpenoids, epoxidized oligomeric terpenes, epoxidized oligomeric terpenoids, epoxidized polymerized terpenes, epoxidized polymerized terpenoids, limonene oxide, limonene dioxide, poly(limonene oxide), poly(isoprene oxide)-co-polyisoprene copolymers, poly(butadiene oxide)-co-polybutadiene copolymers, epoxidized farnesene, epoxidized farnesene, epoxidized myrcene, epoxidized bisabolene, epoxidized linalool, epoxidized terpinolene, epoxidized terpinene, epoxidized geraniol, epoxidized citral, epoxidized retinol, epoxidized beta-carotene, epoxidized arachidonic acid, epoxidized eleostearic acid epoxidized linoleic acid, epoxidized linolenic acid, epoxidized linseed oil, epoxidized tung oil, epoxidized soybean oil, epoxidized peanut oil, epoxidized walnut oil, epoxidized avocado oil, epoxidized sunflower oil, epoxidized corn oil, epoxidized cottonseed oil, epoxidized palm oil, epoxidized glycerol, glycerol diglycidyl ether, glycerol triglycidyl ether, epoxidized sorbitol, sorbitol diglycidyl ether, sorbitol triglycidyl ether, sorbitol tetraglycidyl ether, sorbitol pentaglycidyl ether and sorbitol hexaglycidyl ether, cyclohexanedimethanol diglycidyl ether, resorcinol diglycidyl ether, bisphenol A diglycidyl ether, hydrogenated bisphenol A diglycidyl ether, neopentyl glycol diglycidyl ether, ethylene glycol diglycidyl ether, 1,4-butanediol diglycidyl ether, tetraethylene glycol diglycidyl ether, polydimethylsiloxane diglycidyl ether, epoxidized butadiene oligomers, epoxidized butadiene-co-polynitrile oligomers, epoxidized grapefruit mercaptan, ethoxylated bisphenol A diglycidyl ether, ethoxylated hydrogenated bisphenol A diglycidyl ether, ethoxylated cyclohexanedimethanol diglycidyl ether, or combinations thereof.

In some embodiments, the method of making the curable formulation includes the addition of one or more modifiers to the mixture of step (a) prior to step (b) or during step (b), where the modifiers are one or more of trimethylolpropane tris(3-mercaptopropionate), pentaerythritol tetrakis(3-mercaptopropionate), dipentaerythritol hexakis(3-mercaptopropionate), tris[2-(3-mercaptopropionyloxy)ethyl]isocyanurate, tetraethylene glycol bis(3-mercaptopropionate), 1,10-decanedithiol, ethylene glycol bis(3-mercaptopropionate), 1,2-ethanedithiol, 1,3-propanedithiol, 1,4-butanedithiol, 1,6-hexanedithiol, 1,8-octanedithiol, 2-mercaptoethanol, 2-hydroxyethylacrylate, 2-carboxyethylacrylate, acrylic acid, thioglycolic acid, iso-tridecyl 3-mercaptopropionate, sodium thioglycolate, butyl glycidyl ether, 2-ethylhexyl glycidyl ether, limonene oxide, limonene dioxide, dicyclopentadiene dioxide, castor oil glycidyl ether, 2-amino-2-methyl-1-propanol, vinyl cyclohexene oxide, allyl isothiocyanate, isophorone diisocyanate, bisphenol A ethoxylate diacrylate, bisphenol A ethoxylate diglycidyl ether, ethoxylated trimethylolpropane tris(3-mercaptopropionate), pentaerythritol tetrakis(polycaprolactone, mercaptopropionate terminated), polydimethylsiloxane, diglycidyl ether terminated, glycerol diacrylate, glycerol triacrylate, allyl glycidyl ether, and combinations thereof.

In some other embodiments, the method of making the curable formulation includes the addition of one or more modifiers to the mixture of step (a) prior to step (b) or during step (b), where the one or more modifiers are sand, polymer powders, hydroxyapatite nanopowder, tungsten powder, metal powders, ceramic powders, and combinations thereof.

In non-limiting embodiments, the thermal aging step (step (b)) includes the application of heat to the mixture at a temperature in the range between about 0° C. to about 150° C., 10° C. to about 100° C., 20° C. to about 100° C., 20° C. to about 75° C. The thermal aging step can be applied for a suitable period of time of between about 0.01 hours to about 24 hours, about 0.01 hours to about 20 hours, about 0.01 hours to about 15 hours, about 0.01 hours to about 10 hours, about 0.01 hours to about 5 hours, about 0.01 hours to about 3 hours, about 0.01 hours to about 2 hours, or about 0.01 hours to about 1 hours. In certain instances, the thermal aging step includes the application of agitation to the mixture during all of step (b) or at least some portion of step (b).

In certain embodiments, following the thermal aging step the resulting curable formulation can be stored.

According to certain embodiments, the curable formulations described are uncured as synthesized and additional chemicals can be added to allow or promote curing and an additional step of curing (step (c)) is performed. In some embodiments, the mixture of step (a) further includes free radical initiators, catalysts, or additives that can controllably (i.e., by exposure to an external stimulus) induce or promote curing of the formulation. Exemplary curing processes include, but are not limited to, UV curing, electron beam curing, thermal curing capability, acid and base catalyzed curing and polycondensation reactions. Curing reactions can be used to form a fully crosslinked network polymer or a substantially crosslinked network polymer, wherein substantially refers to a percentage of crosslinking of at least about 80%, 85%, 90%, 91%, 92%, 93%, 94%, 95%, 96%, 97%, 98%, or 99%. Such processes can generally proceed in additive one-pot steps and do not require any purification or any significant purification after reaction completion. Exemplary reactions which may occur during curing such as, thiol-ene/thiol-yne/thiol-acrylate, allyl, vinyl and other chemistries allow for reactions to occur under UV, e-beam, and thermally driven reaction conditions, thiol-epoxy, thiol-acrylate, amine-epoxy, as well as other base-catalyzed reactions that can be processed with or without heating, Michael additions that include acrylate-amine and thiol-acrylate reactions, isocyanate and isothiocyanate reactions with hydroxyl, thiol, amine and other groups. In a UV-based curing step, irradiation energies ranging from 0.15 mJ/cm$^2$ to 5.0 J/cm$^2$ for a period of time in the range of 0.01 seconds to 1 hour can be applied to the curable formulations or mixtures thereof containing a suitable photoinitiator.

According to certain other embodiments, the curable formulations described are uncured as synthesized and additional chemicals can be added to allow or promote curing upon standing for a period of time. It is believed that the addition of chemical agents, such as acid or base catalysts, can promote crosslinking chemistries which result in a cured material over time. As will be appreciated by one skilled in the art the time required to achieve complete or high degree of curing (such as >90% curing) will depend on the amount of chemical agents added and the nature of the reaction chemistries which occur in the formulation.

IV. Methods of Using Curable Formulations and Articles of Manufacture Thereof

The curable formulations can be used in new methods of manufacture. Methods that are used to manufacture materials from the curable formulations are significantly influenced by material processing capability, and processing capability often refers to a material's ability to be successfully and efficiently subjected to various methods of manufacture.

The curable formulations and cured formulations thereof described herein can also be used in processes for fabricating articles from these compositions, and articles fabricated from these compositions.

In some embodiments, the curable formulations can be used to form films and/or slabs on substrates using known techniques. In a non-limiting embodiment, a thermally or chemically curable formulation or mixture thereof can be deposited into a mold and cured at a temperature in the range of about 10° C. to about 150° C., 20° C. to about 130° C., 20° C. to about 120° C., 20° C. to about 100° C., 20° C. to about 75° C., 20° C. to about 50° C. The curing time applied may be from about 10 seconds to 10 days, 10 seconds to 5 days, 10 seconds to 3 days, 10 seconds to 2 days, 10 seconds to 1 day, 10 seconds to 10 hours, 10 seconds to 5 hours, 10 seconds to 1 hours, 10 seconds to 50 minutes, 10 seconds to 40 minutes, 10 seconds to 30 minutes, 10 seconds to 20 minutes, 10 seconds to 10 minutes, 10 seconds to 5 minutes, 10 seconds to 4 minutes, 10 seconds to 3 minutes, 10 seconds to 2 minutes, or 10 seconds to 1 minute.

In some embodiments, composites can be formed from the curable formulations by addition of modifiers and/or fillers as described above. In a non-limiting embodiment, a curable formulation or mixture thereof can be mixed with a modifier and/or filler (i.e., fumed silica) to produce a mixture or dispersion which is then cured under appropriate conditions as described herein. The mixtures can also be used as inks for printing processes as described below.

Curable formulations, mixtures thereof, and composites thereof (which contain modifiers and/or fillers) can be used as inks for a variety of printing applications, such as 3-D printing. In one embodiment, a printing method can include the steps of:
 (a) printing a thermally aged curable formulation including a polythiol constituent; an alkene-containing and/or alkyne-containing constituent; and an epoxy-containing constituent; and
 (b) curing the printed formulation
wherein the curing step is performed simultaneously with the printing of the thermally aged curable formulation of step (a).

In such embodiments, the thermally aged curable formulation further includes an initiator or catalyst which can be decomposed by an external stimulus (i.e., light or heating) to induce curing. In such embodiments, the printing can performed using known techniques such as, but not limited to, stereolithographic additive printing, dynamic light projection printing, an inkjet printing apparatus, a photojet printing, or a direct write process.

In certain 3-D printing embodiments, the printing step includes jetting the thermally aged curable formulation into one or more powders such as sand, polymer powders, hydroxyapatite powders, and tungsten powders which then harden into powder-rich composite materials. Hardening time can be tuned by varying the amount of initiator or catalyst concentration in the formulation). Composite materials with geometric configurations patterned by inkjet deposition can also be cured around powder particles and then removed from the powder-containing glass trays. These patterned composites could then be built upon by further printing (for 3-D inkjet additive manufacturing process) if desired and/or subsequently utilized in a wide number of processing techniques, including the following exemplary processes:

(a) Polymer Powder Sintering: Heating above polymer powder $T_g$ or $T_m$ or subjection to solvent fumes to fuse polymer particles
 (b) Casting: Pouring hardening liquid (e.g., investment) around patterned composite, allowing poured liquid to harden and then burning out polymeric composite to afford a mold with a negative image of original inkjet patterned geometry, which can be used to manufacture metals (e.g., investment casting, foundry production, etc.)
 (c) Ceramic/Metal Sintering: Heating patterned composites to sufficient temperatures to fuse ceramic or metal particles and burn out cured thiol-epoxy polymeric binder constituents.

The advantages of the jettable formulations include the lower toxicities of uncured formulations, as compared to analogous resins like furan-based resins and certain phenolic resins, the excellent wetting to a number of substrates after jetting (wetting is hypothesized to be in part facilitated by sulfur constituency), tunable cure time based on catalyst concentration for powder/catalyst blends onto which resins were jetted, and superior stability in comparison with other epoxy based resins (for example, an epoxy-amine control resin comprised of neopentyl glycol diglycidyl ether and xylylene diamine underwent a substantial viscosity increase at 20° C. only 1-2 h after mixing of epoxy and amine constituents and was consequently shown to be unsuitable for inkjet processing). Additional polythiol monomers that are hypothesized to be ideal for the formulation of low viscosity, epoxy-stable, jettable thiol-epoxy resins include pentaerithritol tetrathiol, farnesene tetrathiol, 1,2,4-trivinylcyclohexanetrimercaptan, linalool dimercaptan and inositol hexathiol.

In yet other embodiments, curable formulations or mixtures thereof, neat, or dissolved or dispersed in water and/or organic solvent) can be applied to a substrate material including, but not limited to, materials made of wood, wire, glass, aluminum, steel, zinc, iron, other metals, metal alloys, ceramics, or combinations thereof, as one or more coatings. The one or more coatings alone or together may be applied to afford a thickness varying from about 0.01 micron to 500 microns, about 0.01 micron to 300 microns, or about 0.01 micron to 100 microns. Exemplary methods including, but not limited to, roll coating, spray coating, brush coating and hot melt coating techniques. For solvent/water dissolved/dispersed coatings, a drying time can be applied which is between 0.1 min and 5 days. For 100% solids UV curable coatings, full or partial curing can be induced by exposure to irradiation energies ranging from 0.15 mJ/cm$^2$ to 5.0 J/cm$^2$ for a period of time in the range of 0.01 seconds to 1 hour.

EXAMPLES

Example 1: Synthesis and Analysis of Expanded Polystyrene Foam

Procedure for GPC Analysis of EPS:

Gel permeation chromatography (GPC) measurements were conducted on expanded polystyrene foam (EPS) samples taken from a series of EPS cups purchased from Chick-fil-A, Inc. A tetrahydrofuran GPC system equipped with a Waters Chromatography (Milford, Mass.) model 1515 isocratic pump, a model 2414 differential refractometer, and a three-column set of Polymer Laboratories (Amherst, Mass.) Styragel columns (PLgel 5 µm Mixed C, 500 Å and 104 Å, 300.sub.-7.5 mm columns). The system was equilibrated at 35° C. in tetrahydrofuran, which served as the polymer solvent and eluent (flow rate set to 1.00 mL/min). Polymer solutions were prepared at a known concentration (about 3 mg/mL), filtered with a 0.2 micron PTFE mesh filter, and an injection volume of 200 μL was used. Data collection and analyses were performed with Precision Acquire software and Discovery 32 software (PrecisionDetectors). The differential refractometer was calibrated with standard polystyrene materials (SRM 706 NIST). The corresponding molecular weight data are provided in Table 1 below.

TABLE 1

Molecular weight data for GPC trace of EPS sample

| Mn (Da) | Mw (Da) | Polydispersity Index |
|---|---|---|
| 150200 | 395800 | 2.635 |

Procedure for EPS Solubility Experiments:

20 small EPS cups purchased from Chick-fil-A, Inc. were massed, and the average mass data and standard deviation is provided in Table 2.

TABLE 2

Average EPS cup weight and standard deviation for 20 EPS cups purchased from Chick-fil-A ®, Inc.

| Avg Cup Weight (g) | Standard Deviation |
|---|---|
| 5.415 | 0.074 |

The data in Table 2 were used to calculate the solubility of the cups in various solvents in cups/gallon. EPS cups were broken down in a professional grade blender to a fine powder, washed with water, and dried in an oven at 100° C. over three days. The powder was used for gel permeation chromatography (vide supra) and solubility tests. EPS solubility tests were conducted for dichloromethane, d-limonene, styrene, ethyl acetate, acetone, petroleum ether, and gasoline (87 octane rating). 5 mL of each solvent was measured and poured into a 20 mL dram vial with a PTFE stir bar. Each vial was sealed and weighed before any polystyrene was added. The vials remained sealed during duration of the experiments except for the time of each EPS addition to prevent solvent evaporation. A small amount of EPS was added to each vial (about 50 mg) and allowed to stir until completely dissolved. Dissolution was aided by vortexing. After each iteration of EPS addition, the solutions were assessed for EPS saturation. EPS addition was terminated when deemed saturated, either when no more EPS would go into solution or until the mixture viscosity prevented stir bar movement. Vials were then weighed to calculate the amount polymer added and each respective EPS solubility. The results of the solubility studies are provided in Table 3.

TABLE 3

Solubility study results for EPS samples taken from Chick-fil-A foam cups for various solvents. Solubility data are provided in cups/gallon solvent

| Solvent | Cups/Gallon |
|---|---|
| Acetone | <77.20 |
| Dichloromethane | 474.44 |

TABLE 3-continued

Solubility study results for EPS samples taken from Chick-fil-A foam cups for various solvents. Solubility data are provided in cups/gallon solvent

| Solvent | Cups/Gallon |
|---|---|
| Ethyl Acetate | 447.63 |
| Gasoline (87 Octane) | <155.71 |
| Limonene | 423.10 |
| Petroleum Ether | <11.2 |
| Styrene | 405.37 |

Dichloromethane and ethyl acetate dissolved the largest amount of EPS, and more polar solvents were not as successful at dissolving similar amounts of polymer (acetone, petroleum ether). D-limonene and styrene also performed well, dissolving nearly as much as dichloromethane and ethyl acetate. 87 octane gasoline was a poor solvent choice for dissolving EPS. Very little of the EPS went into solution, and instead, the EPS mainly swelled. This behavior remained consistent even after one day of stirring at 25° C. The same also occurred for acetone and petroleum ether.

Procedure for Demonstrating Extraction Based Purification of EPS Cup Containing 100 mL Coca-Cola®:

100 mL of Coca-Cola® was poured from an unopened can into a 250 mL glass beaker. The Coca-Cola® was then poured from the glass beaker into a small EPS cup purchased from Chick-fil-A, Inc. 200 mL d-limonene, which was purchased from TCI America, was also poured into a 500 mL glass beaker. The beaker containing the d-limonene was placed on a stir plate at 25° C., and a PTFE stir bar was added. The EPS cup containing the 100 mL Coca-Cola® was then inserted in the beaker that contained the 200 mL d-limonene, and the solution was stirred at a stir setting of 2 (out of 10). After 20-30 seconds, the cup began to dissolve, and after 45 seconds, the cup burst open, and the Coca-Cola® spilled into the beaker of d-limonene. The EPS cup was stirred in the d-limonene/Coca-Cola® mixture for an additional 4 min, after which it was determined to be completely dissolved. Upon turning off the stirring of the solution, two immiscible layers immediately were observable in the 500 mL beaker: the top layer consisted of the EPS cup dissolved in d-limonene, and the bottom layer consisted of Coca-Cola®

Procedure for EPS Reclamation by Curing d-Limonene/ EPS Solution Using UV-Catalyzed Thiol-Ene Free Radical Addition:

Using a syringe, 5 mL of the top layer of the two-layer mixture described above that resulted from dissolution of a Coca-Cola® containing EPS cup into D-limonene was placed in a 20 mL glass vial. Based on the initial mass of the EPS cup and the initial volume of limonene to which the cup was added, a PS concentration of 26.1 mg EPS/mL limonene was assumed, and mass of limonene in the solution, which has a C.dbd.C functionality of 2, was calculated accordingly. A stoichiometric amount of the tetrathiol pentaerythritol tetrakis(3-mercaptopropionate) (PETMP) was added to the solution to give a C.dbd.C:SH ratio of 1:1. 1 wt % of the photoinitiator 2,2-dimethoxy-2-phenylacetophenone (DMPA) was also added to the solution. The PETMP was not initially miscible with the d-limonene/EPS solution; however, upon exposure to 365 nm UV light in a UVP CL-1000 UV Crosslinking Chamber for 20 seconds, the mixture increased in viscosity and eventually became completely clear. The viscous solution was then pipetted out of the glass vial and injected between two 2"×3" glass microscope slides separated by two 1 mm-thick glass spacers and held together using binder clips. The glass slides containing the injected solution were then placed in the UVP Crosslinking Chamber, exposed to 365 nm UV light for 30 min, and subsequently removed from the chamber. Upon separation of the glass slides, an elastomeric film with sufficient mechanical integrity to handle was observed to have formed. The film was post-cured at 120° C. at 1 torr for 12 hours, after which it was removed, handled, and subjected to thermomechanical characterization experiments. Because the EPS composition in this mixture was very low in this example (<0.5 wt %), minimal phase separation was observed in the resulting rubber.

Dynamic Mechanical Analysis:

4 mm×30 mm×1.0 mm rectangular samples for dynamic mechanical analysis (DMA) were machined using a Gravograph LS100 40 W CO2 laser machining device. DMA was performed using a TA Instruments Q800 Dynamic Mechanical Analyzer in the DMA Multifrequency/Strain mode in tension using a deformation of 0.1% strain, a frequency of 1 Hz, a force track of 150%, and a preload force of 0.01 N. Each experiment was run from −50 to 100° C. using a heating rate of 2° C./min. DMA results demonstrated that the PETMP and d-limonene monomers reacted in the presence of UV light to form a thermoset network with a rubbery modulus of approximately 4.2 MPa.

Example 2: Synthesis of Polystyrene Compositions

Polymer Synthesis:

Functional equivalents totaling 10 g of D-limonene (TCI America, >95%) trimethylolpropane tris(3-mercaptopropionate), pentaerithritol tetrakis(3-mercaptopropionate) (Sigma Aldrich, >95%), and/or dipentaerithritol hexakis(3-mercaptopropionate) (Wako, >97%) were massed in glass vials, and 1 wt % 2,2'-dimethoxy-2-phenylacetophenone (DMPA) (Sigma Aldrich, >99%) photoinitiator was added. EPS powder, which was ground from EPS cups provided by Chick-fil-A, Inc. (CFA), was added to the monomer mixtures in varying quantities so as to formulate mixtures with polystyrene compositions of 0, 10, 20, and 30% overall weight fraction. The monomer and EPS mixtures were not miscible initially and were heated to 140° C. for 2 hours, after which the formation of homogeneous solutions occurred. The resulting solutions exhibited viscosity increases with increasing EPS composition. Neat films were cast by injecting the hot solutions inside glass molds preheated to 140° C. The injections were carried out inside a vacuum oven heated to 140° C. The hot glass molds were then immediately removed from the oven, placed in a UVP CL-1000 L 365 nm UV Crosslinking Chamber, and exposed to 365 nm UV irradiation for 1 hour. Within 10-20 seconds of UV exposure, the clear homogeneous solutions inside the glass molds began to turn white, apparently undergoing polystyrene phase separation brought on by either poly(thioether) network formation, cooling temperatures, or both factors. The resulting films became completely white within 1-2 min. After 1 h, the cured films were post-cured at 130° C. at 1 torr for 24 hours. Without polystyrene, the poly(thioether) networks were amorphous, optically clear rubbers, and the addition of PS resulted in the formation of opaque materials.

Microstructural Imaging by Scanning Electron Microscopy:

SEM imaging was used to understand the effects of increasing PS composition on microstructural morphology. SEM samples were prepared by immersion of ~100 mg samples in liquid nitrogen for 30 s, cold fracturing by hand, attempted thermoplastic PS phase extraction by immersion of fractured ~50 mg samples in 100 mL dicholoromethane and light vortexing for 48 hr. using a LabConco RapidVap® apparatus at vortex setting 15 and at ambient temperature and pressure, drying of DCM-swelled samples at 50° C. at 1 torr for 48 h, and gold sputtering with a Cressington 108 sputter coater, model 6002-8 (Ted Pella, Inc., Redding, Calif.) for 60 s at a height of 3 cm, prior to imaging. All samples were imaged on the fractured faces at 25, 500, and 3000× magnification using a Hitachi TM3000 Tabletop Microscope (Hitachi High Technologies America, Inc. Nanotechnology Systems Division, Dallas, Tex.), with a filament current set to 1750 mA. Software used to acquire the images was Bruker Quantax 70 Microanalysis Software package (Bruker Nano GmbH, Berlin, Germany).

Atomic Force Microscopy:

AFM micrographs of the system were taken with an Asylum 3D-SA atomic force microscope operated in tapping mode at 142 kHz, a nominal drive voltage of 500 mV. A silica nitride probe was used with k=40 N/m (Vista Probes) and a nominal tip diameter of 10-15 nm as reported by the manufacturer. Sample preparation included a fast rinse of the samples (0%, 10%, 20% and 30% PS) with a 25% by volume aqueous ethanol solution (<5 seconds) followed immediately by drying under a dry, filtered nitrogen gas flow for ca. 10 minutes and fixture to a glass slide.

Dynamic Mechanical Analysis:

DMA experiments were performed on triplicate samples using a TA Instruments Q800 Dynamic Mechanical Analyzer in the DMA Multifrequency/Strain mode in tension using a deformation of 0.1% strain, a frequency of 1 Hz, a force track of 150%, and a preload force of 0.01 N. Each experiment was run from −50 to 150° C. using a heating rate of 2° C./min on 4.0×25.0×0.75 mm rectangular samples, which were machined using a Gravograph LS100 40 W $CO_2$ laser machining instrument.

Uniaxial Tensile Testing:

ASTM Type V dog bone samples were machined using a Gravograph LS100 40 W $CO_2$ laser machining device. All laser machined samples except for the rubbery 0% PS samples were sanded around the edges using 400, 800 grit sandpaper. Strain-to-failure experiments were conducted at 25° C. in a temperature chamber that utilizes forced convection heating on 0% and 30% samples synthesized in this study and on 100% PS samples (McMaster-Carr, Mw~350 kDa) on n5 specimens for each sample. The experiments were conducted using an Instron Model 5965 electromechanical, screw driven test frame equipped with a 500 N load cell and 1 kN high temperature pneumatic grips. An Instron Advanced Video Extensometer with a 60 mm field-of-view lens optically measured the deformation of the samples by tracking parallel lines applied at the ends of the gauge length. The samples were heated to 25° C. under zero load (unclamped bottom grip). The temperature was held for 10 min to allow for thermal equilibrium to be reached, after which the bottom grip was clamped, and then experiments were started thereafter using a deformation rate of 10 mm/min. Data were recorded using Instron Bluehill 3 software.

Shape Memory Characterization:

To determine percent recoverable strain for select samples, shape memory characterization experiments were performed using a TA Instruments Q800 DMA on laser machined 25.0×4.0×0.4 mm rectangular specimens. In the DMA Strain Rate Mode in tension, rectangular specimens were heated to Tg+25° C. (glass transitions, either for the poly(thioether) rubber networks or for polystyrene) were determined by the peak of the tangent deltas from the previous DMA results), allowed to equilibrate for 30 min, and then strained to deformations of 25%. The strained samples were then cooled to $T_g$–50° C. and allowed to equilibrate for an additional 30 min. For free strain recovery experiments, which were used to measure the percent recoverable strains of the SMPs, the drive force was set to zero after equilibration at Tg–50° C., the samples were re-heated to $T_g$+50° C. at 2° C./min, and the free strain recovery experiments were repeated over four or five cycles. The amount of recoverable deformation was recorded using TA Instruments QSeries software and analyzed using TA Instruments Universal Analysis software.

Silica Filled Composite Synthesis:

Functional equivalents totaling 10 g of D-limonene (TCI America, >95%) trimethylolpropane tris(3-mercaptopropionate), pentaerithritol tetrakis(3-mercaptopropionate) (Sigma Aldrich, >95%), and/or dipentaerithritol hexakis(3-mercaptopropionate) (Wako, >97%) were massed in glass vials, and 1 wt % 2,2'-dimethoxy-2-phenylacetophenone (DMPA) (Sigma Aldrich, >99%) photoinitiator was added. The mixtures were sonicated at 40° C. until the DMPA dissolved in the TMPTMP layer. Heating the immiscible mixtures to 100° C. for 3 min resulted in the formation of a homogeneous solution, which remained homogeneous after cooling to 25° C. The cooled solution was then added in 5 g quantities to FlackTek Max 15 polypropylene mixer cups. To one cup, untreated silica gel (Sigma Aldrich Corporation, ~63.0 μm average particle size) was added, and to another cup, fumed silica (Sigma Aldrich Corporation, 0.2-0.3 μm average particle size) was added. The mixtures were mixed at 1600 rpm for 30 s in a FlackTek DAC 150 FVZ-K Speedmixer, and the resulting monomer/silica mixes appeared to be well-mixed. The silica-containing mixtures were then transferred to glass molds separated by 1 mm-thick spacers, cured using 365 nm UV light for 45 min and post-cured at 120° C. for 24 h at 1 torr. The resulting reinforced thiol-ene composited exhibited significantly increased mechanical integrity in comparison with unfilled analogs.

Example 3: Manufacture Cell Phone Case

Molded Prototype Cell Phone Case Prototype Fabrication:

Structures and articles of manufacture were also demonstrated by the construction of an IPHONE 4® protective case prototype molded from the dissolved product described above. The homogenous mixture described above consisting of D-limonene-co-TMPTMP with 30% PS was molded with UV cure (365 nm) for one hour at 25° C. This prototype case demonstrates the ease with which the material described herein may be processed into useful products for potential industrial application.

A positive mold with geometric dimensions approximately representative of those of a protective case made to fit an APPLE IPHONE 4® cellular device was designed using SolidWorks software. Using a Stratasys Fortus 360 mc 3D printer, positive molds were printed using the Stratasys base-soluble resin. Each printed positive molds was then placed in pre-assembled 2"×6"×4" acrylic molds and attached to the bottom of the mold using super glue. Pre-mixed silicone Sylgard 184® base and curing agent were then poured over the printed molds and evacuated at 1 torr at 25° C. for 5 min, after which a smooth surface layer was observed. The silicone mold was then cured at 50° C. for 4 h. The printed resin was dissolved out of the silicone mold by etching in 0.1 N NaOH solution using the Stratasys base bath for 72 h. The resulting silicone mold contained a negative image of an APPLE IPHONE 4® case. This silicone mold and 50 g of functional equivalents of limonene and TMPTMP with 30 wt % PS additive were pre-heated to 140° C. for 2 h. The dissolved PS solution was then poured in the oven into the silicone mold. The molded solution was then moved into a UVP CL-1000 L 365 nm UV crosslinking chamber, exposed to UV irradiation for 1 h, and post-cured at 130° C. at 1 torr for 24 hours.

The mixture changes in optical behavior from transparency to opacity as the PS content heterophase increases in the D-limonene-co-polythiol networks. D-limonene-co-TMPTMP films containing 0% and 30% PS additives go from nearly transparent to opaque.

Processable Putty Preparation:

Functional equivalents totaling 10 g of D-limonene (TCI America, >95%) trimethylolpropane tris(3-mercaptopropionate), pentaerithritol tetrakis(3-mercaptopropionate) (Sigma Aldrich, >95%), and/or dipentaerithritol hexakis(3-mercaptopropionate) (Wako, >97%) were massed in glass vials, and 1 wt % 2,2'-dimethoxy-2-phenylacetophenone (DMPA) (Sigma Aldrich, >99%) photoinitiator was added. EPS powder, which was ground from EPS cups provided by Chick-fil-A, Inc. (CFA), was added to the monomer mixtures in varying quantities so as to formulate mixtures with polystyrene compositions of 0, 10, 20, and 30% overall weight fraction. The monomer and EPS mixtures were not miscible initially and were heated to 140° C. for 2 hours, after which the formation of homogeneous solutions occurred. The homogeneous mixtures were then cooled to 25° C. and subsequently exhibited transitions from transparency to opacity. The opaque, uncured products were soft, putty-like resins that could be molded into desired geometries and subsequently cured either at 25° C. or by re-heating to elevated temperatures in the range of 140 to 180° C. to re-afford homogeneous solutions, which could then be molded into desired geometries and UV cured. The "putty" like product claimed herein is a metastable all-in-one A+B resin that could be packaged as such and sold as a commercial product fur subsequent curing at a later, desired time.

Processable Putty as a 3D Printable Ink:

The processable putty was molded from an undefined geometric state into a spherical geometric state using applied shear stress/pressure at 25° C. When shear stress/pressure was applied, the putty resin began to flow. Upon removal of the applied shear stress/pressure, the putty resin ceased flowing and maintained the geometry into which it was processed. In this experimental example, the polystyrene precipitated phases act as fillers that stabilize resin mixtures and afford a rheological profile that includes a yield stress, above which flow occurs and below which processed geometry is maintained. Such rheological behavior is consistent with that of a 3D printable or otherwise moldable resin, and upon printing a putting resin the resin could be cured using UV light to fix printed geometries.

Silica Reinforcement as a Route to 3D Printable Rheology:

Approximately 1 g of each of the silica-containing monomer mixtures were removed from the FlackTek Max 15 cups after mixing using a spatula and were transferred to 3 mL polypropylene syringes fitted with 18 gauge needles. Both the unmodified and fumed 10% silica-containing samples flowed from the needle tips and maintained their extruded geometries as observable by unmagnified inspection. Increasing the fumed silica composition to 15% resulted in more difficult needle extrusion but better fixity of extruded filament geometry. These silica-containing inks were then UV cured at 365 nm for 2 h and post-cured at 120° C. for 24 h. When some loss of printed geometry was observed after post-curing, DMPA photoinitiator composition was increased to 5 wt % for the 15 wt % fumed silica sample, and the above process was repeated, after which the syringe-printed geometries were fixed and maintained.

Porous Substrate Preparation:

SEM images (not shown here) revealed remaining rubber phases after solvent extraction of PS phases. These resulting polymers are by definition porous polymers with micro- or nanoporous morphologies. Consequently, the process for preparing micro- or nanoporous polymeric substrates, and preparing such porous substrates through the processes described herein, represent a route to recycling the recycled materials produced through the processes reported.

Example 4: One-Pot Thermal Aging Process

One-Pot Thermal Aging Process for Preparing Curable Formulations:

Twenty Four Formulations:
1. Dipentene dimercaptan-co-triallyl isocyanurate (denoted DPDM-co-TAIC)
2. Dipentene-dipercaptan-co-1,2,4-tivinylcyclohexane (denoted DPDM-co-TVC)
3. Dipentene dimercaptan-co-glyoxal bis(diallyl acetal) (denoted DPDM-co-GLTA)
4. Dipentene dimercaptan-co-glyoxal bis(diallyl acetal) (denoted DPDM-co-GLTA)
5. Dipentene dimercaptan-co-neopentyl glycol diacrylate (denoted DPDM-co-NPGDA)
6. Dipentene dimercaptan-co-tricyclodecane diacrylate (denoted DPDM-co-TCDDA)
7. Dipentene dimercaptan-co-polyethylene glycol diacrylate, $M_n$ 250/700 (denoted DPDM-co-PEGDA-250/700)
8. Dipentene dimercaptan-co-trimethylolpropane triacrylate (denoted DPDM-co-TMPTA)
9. Dipentene dimercaptan-co-pentaerythritol tetracrylate (denoted DPDM-co-PETTA)
10. Dipentene dimercaptan-co-cyclohexanedimethanol diglycidyl ether (denoted DPDM-co-CHDMDGE)
11. Dipentene dimercaptan-co-neopentyl glycol diglycidyl ether (denoted DPDM-co-NPGDGE)
12. Dipentene dimercaptan-co-ethylene glycol diglycidyl ether (denoted DPDM-co-EGDGE)
13. Dipentene dimercaptan-co-bisphenol A diglycidyl ether (denoted DPDM-co-BADGE)
14. Dipentene dimercaptan-co-glycerol diglycidyl ether (denoted DPDM-co-GDGE)
15. Dipentene dimercaptan-co-1,4-butanediol diglycidyl ether (denoted DPDM-co-BDDGE)
16. Dipentene dimercaptan-co-hydrogenated bisphenol A diglycidyl ether (denoted DPDM-co-HBADGE)
17. Dipentene dimercaptan-co-sorbitol polyglycidyl ether (denoted DPDM-co-SPGE)
18. Dipentene dimercaptan-co-triphenylolmethane triglycidyl ether (denoted DPDM-co-TPMTGE)
19. Dipentene dimercaptan-co-N,N-diglycidyl-4-glycidyloxyaniline (denoted DPDM-co-NGA)
20. Dipentene dimercaptan-co-4,4'-Methylenebis(N,N-diglycidylaniline) (denoted DPDM-co-4MGA)
21. Dipentene dimercaptan-co-epoxidized butadiene oligomer (denoted DPDM-co-EBD)
22. Dipentene dimercaptan-co-epoxidized butadiene/nitrile oligomer (denoted DPDM-co-EBDN)
23. Dipentene dimercaptan-co-epoxidized polyamide oligomer (denoted DPDM-co-EPAM); and
24. Dipentene dimercaptan-co-resorcinol diglycidyl ether (denoted DPDM-co-RDGE) were prepared from a mercaptanized terpene, dipentene dimercaptan, and a variety of non-mercaptinized constituents having varying chemical functionalities using one-pot synthetic processes by adding the respective constituents to a sealable glass reaction jars (40 mL up to 1 L in size) with thermosetting caps rated up to 150° C. After one-pot addition of the respective constituents to the sealable glass jars, additional modifier constituents (see above for definitions) were optionally added to tailor the physical and thermomechanical properties of the resulting materials 1-24 listed above in stoichiometric equivalents ranging from 0.01 to 5.00 to the above species 1-24.

The modifiers were added in concentrations ranging from 0.1 to 90 mole % to modify the physical and/or thermomechanical properties of the uncured formulations and the cured formulations and mixtures thereof.

The formulations with or without added modifiers were subjected to a thermal aging processes by heating the prepared formulations in sealed containers to temperatures ranging from about 0° C. to 80° C. for times ranging from 0.01 h to 24 h, optionally under a gentle vortex agitation using a LabConco RapidVap instrument at a vortex speed of 15. Thermal aging is not essential to this method but can be beneficial.

During the thermal aging process, various addition reactions with no chemical by-products were selectively carried out in order to modify the molecular and macromolecular properties of the species being formed during thermal aging for the purpose of tuning the physical, mechanical, and/or thermomechanical properties and curing profiles of the uncured curable formulations and the physical, mechanical, and/or thermomechanical properties of the curable formulations when cured. Chemical addition reactions carried out during the thermal aging processes included free radical-initiated thiol-ene addition by using thermal initiators, such as AIBN in 0.01 to 10 wt % concentrations, base catalyzed thiol-acrylate and amine-acrylate Michael Additions using tertiary amine catalysts such as triethylene diamine in 0.001 to 10 wt % concentrations, base catalyzed thiol-epoxy and thiol-amine reactions using tertiary amine catalysts such as triethylene diamine in 0.001 to 10 wt % concentrations.

After thermal aging, the formulations were either stored for future curing or blended with other formulations and additional modifiers and then stored for curing. Viscosities of thermally aged formulations did not increase after 60 days of storage at 25° C. It was noted that all thermally aged formulations except for those containing free acrylate species exhibited no increase in viscosity after heating to 80° C. for 72 h.

Characterization of Uncured and Cured Formulations:

Approximate viscosities for thermally aged formulations were measured using the Zahn cup method (ASTM D4212). Thermomechanical assessments of each formulation material were carried out using a qualitative material inspection assessment. Characterization data and notes about each respective uncured and cured formulation are provided in Table 4 below.

TABLE 4

Cured Formulation Material Performance Summary

| Formulation (Cured) | Modulus at 20° C. | Observations |
| --- | --- | --- |
| DPDM-co-TAIC | Glassy | Excellent toughness & shape memory behavior, excellent water & solvent resistance |
| DPDM-co-TVC | Viscoelastic to Elastomeric | High energy damping, high recoverable viscoelastic deformation, good water & solvent resistance |
| DPDM-co-GLTA | Viscoelastic to Elastomeric | Poor mechanical integrity |
| DPDM-co-NPGDA | Glassy to Viscoelastic | Good toughness in viscoelastic regime near 25° C. |
| DPDM-co-TCDDA | Glassy | Good toughness in glassy regime near 25° C. |
| DPDM-co-PEGDA-250/700 | Viscoelastic to Glassy | Good toughness in viscoelastic regime near 25° C. |
| DPDM-co-TMPTA | Glassy | Average toughness in glassy regime near 25° C. |
| DPDM-co-PETTA | Glassy | Good toughness in glassy regime near 25° C. |
| DPDM-co-CHDMDGE | Glassy | Good toughness near 25° C., good sunlight resistance |
| DPDM-co-NPGDGE | Viscoelastic to Elastomeric | Good flexibility near 25° C. |
| DPDM-co-EGDGE | Viscoelastic to Elastomeric | Good flexibility near 25° C. |
| DPDM-co-BADGE | Glassy | Good flexibility near 25° C. |
| DPDM-co-GDGE | Viscoelastic | Good flexibility near 25° C. |
| DPDM-co-BDDGE | Viscoelastic | Good flexibility near 25° C. |
| DPDM-co-HBADGE | Glassy | Good toughness near 25° C., good sunlight resistance |
| DPDM-co-SPGE | Glassy | Good toughness near 25° C. |
| DPDM-co-TPMTGE | Glassy | High rigidity |
| DPDM-co-NGA | Glassy | Good toughness in glass state near 25° C. |
| DPDM-co-4MGA | Glassy | High rigidity |
| DPDM-co-EBD | Elastomeric | High flexibility near 25° C., good strain capacity |
| DPDM-co-EBDN | Elastomeric | High flexibility near 25° C., good strain capacity |
| DPDM-co-EPAM | Glassy | Good toughness in glass state near 25° C. |
| DPDM-co-RDGE | Glassy | Good toughness in glass state near 25° C. |

"Good toughness" is defined as an approximate toughness of 2.50 MJ/m$^3$ to 4.99 MJ/m$^3$.

"Excellent toughness" is defined as an approximate toughness of 5.0 J/m$^3$ to 50.00 MJ/m$^3$.

"High" rigidity refers to an approximate storage modulus of 900 MPa at 1 Hz and 25° C.

"High recoverable viscolelastic deformation refers to an approximate recoverable deformation of 20% to 500%.

Film Substrate Preparation:

To prepare UV curable film samples, liquid formulations were injected by pipet into 2.0"×3.0"×1.0 mm glass molds and then subjected to 365 nm or 410 nm UV irradiation at energy doses ranging from 0.001 J/cm$^2$ to 60 J/cm$^2$. After UV curing, films for each formulation were cut into two separate 1.5"×1.0"×1.0 mm films, of which one film of each formulation was stored without post-curing and the other film of each formulation was post-cured at 200° C. for 5 min. To prepare thermally curable or base curable film samples, reactive thermally curable systems were mixed in desired ratios, and then 5 g of each formulation or mixture was poured into a polypropylene mold and cured using temperatures ranging from 20° C. to 120° C. for times ranging from 10 seconds to 14 days.

Fumed Silica Addition:

Fumed silica nanoparticles were added to selected curable formulations, including DPDM-co-TAIC. A 20 g scale of 3 wt % mixture of fumed silica nanoparticles with an average particle size of 200 m$^2$ and an uncured DPDM-co-TAIC formulation with 2 wt % DMPA photoinitiator was heated to 80 C for 1 h in a 40 mL glass vial and shaken twice by hand during heating. After 1 h, fumed silica dispersion appeared to be homogeneous, and the silica/uncured formulation mixture was translucent with a viscosity at 25 C that appeared suitable for low-viscosity manufacturing processes including DLP and SLA 3D printing. Fumed silica was added both to modify rheology of uncured formulations and to tailor mechanical strength of cured materials. Specifically, fumed silica was added to increase the toughness of cured materials at temperatures significantly above glass transition but below thermal decomposition.

UV Curable Formulations & Mixtures Processed by Photojet & Stereolithography Additive (SLA) Manufacturing:

The UV curable formulations above were subjected to photojet and stereolithography additive (SLA) manufacturing techniques. Exemplary formulations of resins subjected to photojet 3-D printing include dipentene dimercaptan (DPDM)-co-triallyl isocyanurate (DPDM-co-TAIC), using a 1.0:1.0 SH:C═C stoichiometric ratio, 2.0 wt % DMPA photoinitiator (2,2-dimethoxy-2-phenylacetophenone), and up to 500 ppm 4-methoxyphenol free radical inhibitor. This cured formulation exhibited a viscosity of 6-7 cP at 50° C. and was consequently jettable. Another jettable formulation was formed of D-limonene-co-[0.50 TMPTMP:0.50 1,10-decanedithiol], 1.0:1.0 C═C:SH stoichiometric ratio, 5.0 wt % DMPA photoinitiator. This cured formulation exhibited a viscosity of ~20 cP at 50° C. and was also jettable. Photojet additive manufacturing was carried out using a proprietary inkjet 3D printer that uses 365 nm UV irradiation to harden low viscosity photocurable resins immediately after jetting. A printed scaffold structure with approximately a 200 micron scaffold strut feature resolution (not shown) formed of the above D-limonene-co-[0.50 TMPTMP: 0.50 1,10-decanedithiol] was achieved.

For processing by SLA additive manufacturing, formulations were printed using a FORMLABS® Form2 commercially available 3-D printer. An exemplary formulation for SLA 3-D printing is dipentene dimercaptan-co-trimethylolpropane triacrylate (DPDM-co-TMPTA), using a 1.0:2.0 acrylate:SH stoichiometric ratio, 0.40 wt % TPO photoinitiator (2,4,6-Trimethylbenzoyl-0.16 wt % OB+UV blocker (2,2'-(2,5-thiophenediyl)bis(5-tert-butylbenzoxazole)), and up to 500 ppm 4-methoxyphenol free radical inhibitor. To demonstrate that this formulation could be successfully 3-D printed using the Formlabs Form2 SLA printer, a standard support base was printed using a 0.1 mm layer thickness, a density of 1.00, a point size of 0.60 mm, a flat spacing of 5.00 mm, a slope multiplier of 1.00 and a base thickness of 2.00 mm. After printing, the 3D printed base was washed in isopropanol for 5 min and then post-cured using a DYMAX® ~405 nm UV cure chamber for 2 min. The post-cured 3D printed part was again washed in isopropanol for an additional 60 sec and patted dry using a paper towel. This 2 mm-thick washed and post-cured 3D printed base exhibited high rigidity, good optical clarity, excellent mechanical integrity, minimal yellowing and good resistance to many solvents.

Stable Low-Viscosity Formulations for Manufacturing Techniques that Utilize 3-D Inkjet Processing:

Processing of one-part curable formulations with viscosities suitable for ink jet processing (e.g., viscosity between 1.0 and 100.0 cP at 20° C.) were carried out successfully using a proprietary ink jet 3D printing system. The formulations being printed showed no increase in viscosity over a 4 week period and were compatible with the inkjet processing system's internal design materials and components thereof. Exemplary thiol-epoxy formulations are listed in Table 5 below, where DPDM=dipentene dimercaptan, PETMP=pentaerithritol tetrakis(3-mercaptopropionate), TMPTMP=trimethylolpropane tris(3-mercaptopropionate), NPGDGE=neopentyl glycol diglycidyl ether, TMPTGE=trimethylolpropane triglycidyl ether, CHDMDGE=cyclohexanedimethanol diglycidyl ether, and 2EHGE=2-ethylhexyl glycidyl ether. Predicted viscosities were calculated using a parallel mixing equation in which viscosity for formulations was calculated to be the sum of the products of the volume fraction of each constituent multiplied by the viscosity of each constituent.

TABLE 5

Exemplary formulations, calculated viscosities, epoxy/SH ratios, and average epoxy and SH functionalities ($F_{av}$) for jettable low-viscosity resins used in inkjet processing techniques

| Formulation | Calculated Viscosity (cP) | Epoxy/SH | $F_{av}$ Epoxy | $F_{av}$ SH |
|---|---|---|---|---|
| 1. [0.90 DPDM:0.10 PETMP]-co-[0.40 NPGDGE:0.60 TMPTGE:0.15 2EHGE] | 43.1 | 0.934 | 2.22 | 2.16 |
| 2. [0.80 DPDM:0.20 TMPTMP-co-[0.50 NPGDGE:0.45 TMPTGE:0.10 2EHGE] | 37.4 | 0.934 | 2.20 | 2.18 |
| 3. [0.90 DPDM:0.10 PETMP]-co-[0.75 NPGDGE:0.20 TMPTGE:0.10 2EHGE] | 34.3 | 1.035 | 2.06 | 2.16 |
| 4. [0.75 DPDM:0.25 TMPTMP-co-[0.40 NPGDGE:0.20 TMPTGE:0.25 CHDMDGE:0.20 2EHGE] | 36.5 | 1.050 | 2.11 | 1.91 |
| 5. DPDM-co-[0.70 NPGDGE:0.30 TMPTGE] | 23.6 | 1.000 | 2.31 | 1.91 |
| 6. [0.725 DPDM:0.275 TMPTMP]-co-[0.35 NPGDGE:0.5 TMPTGE:0.15 CHDMDGE] | 42.00 | 1.148 | 2.24 | 2.27 |

The formulated thiol-epoxy mixtures, such as those listed in Table 5 above, were mixed in total mixture quantities ranging from 5 mL to 20 L. To demonstrate the stability of each formulation, each formulated mixture was heated to 80° C. for 24 hours and was shown to maintain a constant viscosity before and after heating. The formulations were subjected to inkjet processing techniques used in various manufacturing processes. In one exemplary process, sebacic acid nano- and micropowders were impregnated by mixing with a small amount of tertiary amine catalysts (approximately 0.1 to 10.0 wt %) that included triethylene diamine (TEDA="DABCO") using a FlackTek® DAC 150 speed mixer. Amine catalyst-impregnated sebacic acid powders were poured into and spread evenly throughout 8"×12"×2" glass pans, and formulated thiol-epoxy mixtures were jetted onto the powder surfaces from 25, 50, 100, 150 and 250 μm nozzles in a controlled manner representative of that of a printhead used in inkjet printing processes to form pre-designed shapes. As liquid thiol-epoxy formulated resins were jetted onto powder surfaces, excellent wetting to sebacic acid and other powders (e.g., sand, polymer powders, hydroxyapatite nanopowder, tungsten powder, etc.) was observed, and jetted thiol-epoxy resins hardened to form powder-rich composite materials within minutes to hours to days after jetting onto powders Coatings:

Uncured formulations (neat, or dissolved or dispersed in a solvent or water) were applied as coatings between 1 micron to 300 microns in thickness using roll coating, spray coating, brush coating and hot melt coating techniques. For solvent/water dissolved/dispersed coatings, drying time was tunable between 5 min and 5 days. For 100% solids UV curable coatings, full cure occurred with irradiation energies ranging from 0.15 mJ/cm$^2$ to 5.0 J/cm$^2$.

A dipentene dimercaptan (DPDM)-co-triallyl isocyanurate coating with 3.0 wt % EVONIK® Aerosil R972 fumed silica (varying photoinitiator, 0.1 to 5.0 wt %, DMPA and TPO photoinitiator) was prepared by mixing DPDM/TAIC and fumed silica in a FlackTek® speed mixer at a 3000 RPM for 90 seconds. The resulting mixture's viscosity remained very low, approximately 20-60 cP at 25 C. This mixture was applied to a glass substrate using a BYRD bar at a 2 mil thickness and cured using UV irradiation with irradiation doses varying from 0.10 mJ/cm$^2$ to 5.0 J/cm$^2$ (wavelengths=365 nm and 390-410 nm). This DPDM-co-TAIC+ 3.0 wt % Aerosil R972 UV cured formulation passed a proprietary glass adhesion test administered within the printing industry.

Those skilled in the art will recognize, or be able to ascertain using no more than routine experimentation, many equivalents to the specific embodiments of the invention described herein. Such equivalents are intended to be encompassed by the following claims.

I claim:

1. A curable formulation, the formulation comprising:
   a polythiol constituent;
   an alkene-containing and/or alkyne-containing monomeric and/or oligomeric constituent; and
   an epoxy-containing constituent.

2. The curable formulation of claim 1, wherein the polythiol constituent is derived from a mercaptan-containing terpene or terpenoid, a mercaptan-containing cyclic alkene, a mercaptan-containing polycyclic alkene, a mercaptan-containing linear alkene, a mercaptan-containing alkyne, a mercaptan-containing unsaturated fatty acid, a mercaptan-containing unsaturated fatty ester, or a mercaptan-containing polyalkene.

3. The curable formulation of claim 1, wherein the polythiol constituent is derived from trimethylolpropane trithiol, pentaerithritiol trithiol, pentaerithritol tetrathiol, inositol, and dithiols, trithiols, tetrathiols, pentathiols, hexathiols, or combinations thereof.

4. The curable formulation of claim 2, wherein the mercaptan-containing terpene or terpenoid is selected from the group consisting of dipentene dimercaptan, isoprene dimercaptan, farnesene dimercaptan, farnesene trimercaptan, farnesene tetramercaptan, myrcene dimercaptan, myrcene trimercaptan, bisabolene dimercaptan, bisabolene trimercaptan, linalool dimercaptan, terpinolene dimercaptan, terpinene dimercaptan, geraniol dimercapan, citral dimercaptan, retinol dimercaptan, retinol trimercaptan, retinol tetramercaptan, beta-carotene polymercaptans, and combinations thereof.

5. The curable formulation of claim 2, wherein the mercaptan-containing cyclic alkene, mercaptan-containing polycyclic alkene, or linear aliphatic alkene is selected from the group consisting of trivinylcyclohexene dimercaptan, trivinylcyclohexene trimercaptan, dicyclopentadiene dimercaptan, vinylcyclohexene dimercaptan, triallylisocyanurate dimercaptan, triallyl isocyanurate trimercaptan, and combinations thereof.

6. The curable formulation of claim 2, wherein the mercaptan-containing alkyne is selected from the group consisting of phenylhepta-1,3,5-triyne polymercaptans, 2-butyne-1,4-diol dimercaptan, propargyl alcohol dimercaptan, dipropargyl sulfide polymercaptans, dipropargyl ether polymercaptans, propargylamine dimercaptan, dipropargylamine polymercaptans, tripropargylamine polymercaptans, tripropargyl isocyanurate polymercaptans, tripropargyl cyanurate polymercaptans, and combinations thereof.

7. The curable formulation of claim 2, wherein the mercaptan-containing fatty acids or fatty acid esters are selected from the group consisting of arachidonic acid dimercaptan, arachidonic acid trimercaptan, arachidonic acid tetramercaptan, eleostearic acid dimercaptan, eleostearic acid trimercaptan, linoleic acid dimercaptan, linolenic acid dimercaptan, linolenic acid trimercaptan, mercaptanized linseed oil, mercaptanized tung oil, mercaptanized soybean oil, mercaptanized peanut oil, mercaptanized walnut oil, mercaptanized avocado oil, mercaptanized sunflower oil, mercaptanized corn oil, mercaptanized cottonseed oil, and combinations thereof.

8. The curable formulation of claim 2, wherein the alkene constituent is selected from the group consisting of terpenes, terpenoids, dimerized terpene, dimerized terpenoids, trimerized terpenes, trimerized terpenoids, oligomeric terpenes or terpenoids, limonene, D-limonene, L-limonene, poly(limonene), farnesene, myrcene, bisabolene, linalool, terpinolene, terpinene, geraniol, citral, retinol, beta-carotene, triallyl isocyanurate, 1,2,4-trivinyl cyclohexane, norbornene functionalized poly(terpene) oligomers, norbornene-functionalized polydimethylsiloxane, norbornene-functionalized poly(butadiene), norbornene-functionalized polyisoprene oligomers, poly(isoprene), divinyl ether, triallylamine, diallylamine, diallyl bisphenol A, cyclohexanedimethanol diallyl ether, pentaerithritol tetraallyl ether, trimethylolpropane triallyl ether, 2,4,6-triallyloxy-1,3,5-triazine, inositol diallyl ether, inositol triallyl ether, inositol tetraallyl ether, inositol pentaallyl ether, inositol hexaallyl ether, inositol divinyl ether, inositol trivinyl ether, inositol tetravinyl ether, inositol pentavinyl ether, inositol hexavinyl ether, triallyl citrate, trivinyl citrate, 1,5-cyclooctadiene, 1,3-cyclooxtadiene, 1,4-cyclooctadiene, 1,3-6 cyclooctatriene, cyclohexane diallyl ether, cyclohexane triallyl ether, cyclohexane tetraallyl ether, cyclohexane pentaallyl ether, cyclohexane hexaallyl ether, cyclohexane divinyl ether, cyclohexane trivinyl ether, cyclohexane tetravinyl ether, cyclohexane pentavinyl ether, cyclohexane hexavinyl ether, diclyclopentadiene, tricyclodecane dimethanol divinyl ether, tricyclodecane dimethanol diallyl ether, tricyclodecane dimethanol, norbornene capped, bicyclo[2.2.1]hepta-2,5-diene, norbornene-functionlized polyamide oligomers, allyl ether-functionlized polyamide oligomers, vinyl ether-functionalized polyamide oligomers, norbornene-functionlized polydimethylsiloxane, allyl ether-functionlized polydimethylsiloxane, vinyl ether-functionlized polydimethylsiloxane, resorcinol diallyl ether, resorcinol divinyl ether, diallylamine, triallylamine, allylamine, and combinations thereof.

9. The curable formulation of claim 1, comprising an acrylate or methacrylate group as the alkene-containing constituent.

10. The curable formulation of claim 9, wherein the acrylate or methacrylate group is selected from the group consisting of neopentyl glycol diacrylate, glycerol diacrylate, glycerol triacrylate, ethylene glycol diacrylate, tetraethylene glycol diacrylate, trimethylolpropane triacrylate, tris[2-(acryloyloxy)ethyl] isocyanurate, pentaerithritol tetraacrylate, pentaerithritol triacrylate, ethoxylated trimethylolpropane triacrylate, ethyoxylated pentaerithritol triacrylate, ethoxylated pentaerithritol tetraacrylate, poly (dimethylsiloxane) diacrylate, poly(isoprene) diacrylate, poly(butadiene-co-nitrile) diacrylate, polyethyleneglycol diacrylate, tricyclodecantedimethanol diacrylate, bisphenol A diacrylate, ethoxylated bisphenol A diacrylate, and methacrylated equivalents thereof.

11. The curable formulation of claim 1, wherein the alkyne constituent is selected from the group consisting of acetylene, propargyl alcohol, 2-butyne-1,4-diol, phenylhepta-1,3,5-triyne, dipropargyl sulfide, dipropargyl ether, propargylamine, dipropargylamine, tripropargylamine, tripropargyl isocyanurate, tripropargyl cyanurate, propargyl inositol, dipropargyl inositol, tripropargyl inositol, tetrapropargyl inositol, pentapropargyl inositol, hexapropargyl inositol, dipropargylpiperazine, dipropargyl citrate, tripropargyl citrate, cyclohexanedimethanol propargyl ether, cyclohexanedimethanol dipropargyl ether, quinic acid lactone propargyl ether, quinic acid lactone dipropargyl ether, quinic acid lactone tripropargyl ether, tricyclodecanedimethanol propargyl ether, tricyclodecanedimethanol dipropargyl ether, bisphenol A bis(propargyl ether), hydrogenated bisphenol A bis(propargyl ether), cyclohexane dipropargyl ether, cyclohexane tripropargyl ether, cyclohexane tetrapropargyl ether, cyclohexane pentapropargyl ether, cyclohexane hexapropargyl ether, propargyl resorcinol, dipropargyl resorcinol, and combinations thereof.

12. The curable formulation of claim 1, wherein the epoxy-containing constituent is selected from the group consisting of epoxidized terpenes, epoxidized terpenoids, epoxidized dimerized terpenes, epoxidized dimerized terpenoids, epoxidized trimerized terpenes, epoxidized trimerized terpenoids, epoxidized oligomeric terpenes, epoxidized oligomeric terpenoids, epoxidized polymerized terpenes, epoxidized polymerized terpenoids, limonene oxide, limonene dioxide, poly(limonene oxide), poly(isoprene oxide)-co-polyisoprene copolymers, poly(butadiene oxide)-co-polybutadiene copolymers, epoxidized farnesene, epoxidized farnesene, epoxidized myrcene, epoxidized bisabolene, epoxidized linalool, epoxidized terpinolene, epoxidized terpinene, epoxidized geraniol, epoxidized citral, epoxidized retinol, epoxidized beta-carotene, epoxidized arachidonic acid, epoxidized eleostearic acid epoxidized linoleic acid, epoxidized linolenic acid, epoxidized linseed oil, epoxidized tung oil, epoxidized soybean oil, epoxidized peanut oil, epoxidized walnut oil, epoxidized avocado oil, epoxidized sunflower oil, epoxidized corn oil, epoxidized cottonseed oil, epoxidized palm oil, epoxidized glycerol, glycerol diglycidyl ether, glycerol triglycidyl ether, epoxidized sorbitol, sorbitol diglycidyl ether, sorbitol triglycidyl ether, sorbitol tetraglycidyl ether, sorbitol pentaglycidyl ether and sorbitol hexaglycidyl ether, cyclohexanedimethanol diglycidyl ether, resorcinol diglycidyl ether, bisphenol A diglycidyl ether, hydrogenated bisphenol A diglycidyl ether, neopentyl glycol diglycidyl ether, ethylene glycol diglycidyl ether, 1,4-butanediol diglycidyl ether, tetraethylene glycol diglycidyl ether, polydimethylsiloxane diglycidyl ether, epoxidized butadiene oligomers, epoxidized butadiene-co-polynitrile oligomers, epoxidized grapefruit mercaptan, ethoxylated bisphenol A diglycidyl ether, ethoxylated hydrogenated bisphenol A diglycidyl ether, ethoxylated cyclohexanedimethanol diglycidyl ether, and combinations thereof.

13. The curable formulation of claim 1, further comprising one or more modifiers selected from the group consisting of sand, polymer powders, hydroxyapatite nanopowder, tungsten powder, metal powders, ceramic powders, and combinations thereof.

14. A method of making the curable formulation of claim 1 comprising the steps of:
(a) mixing a polythiol constituent; an alkene-containing and/or alkyne-containing monomeric and/or oligomeric constituent; and an epoxy-containing constituent; and
(b) thermally aging the mixture.

15. The method of claim 14, wherein the polythiol constituent is derived from a mercaptan-containing terpene or terpenoid, a mercaptan-containing cyclic alkene, a mercaptan-containing polycyclic alkene, a mercaptan-containing linear alkene, a mercaptan-containing alkyne, a mercaptan-containing unsaturated fatty acid, a mercaptan-containing unsaturated fatty ester, or a mercaptan-containing polyalkene.

16. The method of claim 14, wherein the polythiol constituent is derived from trimethylolpropane trithiol, pentaerithritiol trithiol, pentaerithritol tetrathiol, inositol, and dithiols, trithiols, tetrathiols, pentathiols, hexathiols, or combinations thereof.

17. The method of claim 15, wherein the mercaptan-containing terpene or terpenoid is selected from the group consisting of dipentene dimercaptan, isoprene dimercaptan, farnesene dimercaptan, farnesene trimercaptan, farnesene tetramercaptan, myrcene dimercaptan, myrcene trimercaptan, bisabolene dimercaptan, bisabolene trimercaptan, linalool dimercaptan, terpinolene dimercaptan, terpinene dimercaptan, geraniol dimercapan, citral dimercaptan, retinol dimercaptan, retinol trimercaptan, retinol tetramercaptan, beta-carotene polymercaptans, and combinations thereof.

18. The method of claim 15, wherein the mercaptan-containing cyclic alkene, mercaptan-containing polycyclic alkene, or linear aliphatic alkene is selected from the group consisting of trivinylcyclohexene dimercaptan, trivinylcyclohexene trimercaptan, dicyclopentadiene dimercaptan, vinylcyclohexene dimercaptan, triallylisocyanurate dimercaptan, triallyl isocyanurate trimercaptan, and combinations thereof.

19. The method of claim 15, wherein the mercaptan-containing alkyne is selected from the group consisting of phenylhepta-1,3,5-triyne polymercaptans, 2-butyne-1,4-diol dimercaptan, propargyl alcohol dimercaptan, dipropargyl sulfide polymercaptans, dipropargyl ether polymercaptans, propargylamine dimercaptan, dipropargylamine polymercaptans, tripropargylamine polymercaptans, tripropargyl isocyanurate polymercaptans, tripropargyl cyanurate polymercaptans, and combinations thereof.

20. The method of claim 15, wherein the mercaptan-containing fatty acids or fatty acid esters is selected from the group consisting of arachidonic acid dimercaptan, arachidonic acid trimercaptan, arachidonic acid tetramercaptan, eleostearic acid dimercaptan, eleostearic acid trimercaptan, linoleic acid dimercaptan, linolenic acid dimercaptan, linolenic acid trimercaptan, mercaptanized linseed oil, mercaptanized tung oil, mercaptanized soybean oil, mercaptanized peanut oil, mercaptanized walnut oil, mercaptanized avocado oil, mercaptanized sunflower oil, mercaptanized corn oil, mercaptanized cottonseed oil, and combinations thereof.

21. The method of claim 15, wherein the alkene constituent is selected from the group consisting of terpenes, terpenoids, dimerized terpene, dimerized terpenoids, trimerized terpenes, trimerized terpenoids, oligomeric terpenes or terpenoids, limonene, D-limonene, L-limonene, poly(limonene), farnesene, myrcene, bisabolene, linalool, terpinolene, terpinene, geraniol, citral, retinol, beta-carotene, triallyl isocyanurate, 1,2,4-trivinyl cyclohexane, norbornene functionalized poly(terpene) oligomers, norbornene-functionalized polydimethylsiloxane, norbornene-functionalized poly (butadiene), norbornene-functionalized polyisoprene oligomers, poly(isoprene), divinyl ether, triallylamine, diallylamine, diallyl bisphenol A, cyclohexanedimethanol diallyl ether, pentaerithritol tetraallyl ether, trimethylolpropane triallyl ether, 2,4,6-triallyloxy-1,3,5-triazine, inositol diallyl ether, inositol triallyl ether, inositol tetraallyl ether, inositol pentaallyl ether, inositol hexaallyl ether, inositol divinyl ether, inositol trivinyl ether, inositol tetravinyl ether, inositol pentavinyl ether, inositol hexavinyl ether, triallyl citrate, trivinyl citrate, 1,5-cyclooctadiene, 1,3-cyclooxtadiene, 1,4-cyclooctadiene, 1,3-6 cyclooctatriene, cyclohexane diallyl ether, cyclohexane triallyl ether, cyclohexane tetraallyl ether, cyclohexane pentaallyl ether, cyclohexane hexaallyl ether, cyclohexane divinyl ether, cyclohexane trivinyl ether, cyclohexane tetravinyl ether, cyclohexane pentavinyl ether, cyclohexane hexavinyl ether, diclyclopentadiene, tricyclodecane dimethanol divinyl ether, tricyclodecane dimethanol diallyl ether, tricyclodecane dimethanol, norbornene capped, bicyclo[2.2.1]hepta-2,5-diene, norbornene-functionlized polyamide oligomers, allyl ether-functionlized polyamide oligomers, vinyl ether-functionalized polyamide oligomers, norbornene-functionlized polydimethylsiloxane, allyl ether-functionlized polydimethylsiloxane, vinyl ether-functionlized polydimethylsiloxane, resorcinol diallyl ether, resorcinol divinyl ether, diallylamine, triallylamine, allylamine, and combinations thereof.

22. The method of claim 14, wherein the alkene constituent is an acrylate or methacrylate group.

23. The method of claim 22, wherein the acrylate or methacrylate group is selected from the group consisting of neopentyl glycol diacrylate, glycerol diacrylate, glycerol triacrylate, ethylene glycol diacrylate, tetraethylene glycol diacrylate, trimethylolpropane triacrylate, tris[2-(acryloyloxy)ethyl] isocyanurate, pentaerithritol tetraacrylate, pentaerithritol triacrylate, ethoxylated trimethylolpropane triacrylate, ethyoxylated pentaerithritol triacrylate, ethoxylated pentaerithritol tetraacrylate, poly(dimethylsiloxane) diacrylate, poly(isoprene) diacrylate, poly(butadiene-co-nitrile) diacrylate, polyethyleneglycol diacrylate, tricyclodecantedimethanol diacrylate, bisphenol A diacrylate, ethoxylated bisphenol A diacrylate, and methacrylated equivalents thereof.

24. The method of claim 14, wherein the alkyne constituent is selected from the group consisting of acetylene, propargyl alcohol, 2-butyne-1,4-diol, phenylhepta-1,3,5-triyne, dipropargyl sulfide, dipropargyl ether, propargylamine, dipropargylamine, tripropargylamine, tripropargyl isocyanurate, tripropargyl cyanurate, propargyl inositol, dipropargyl inositol, tripropargyl inositol, tetrapropargyl inositol, pentapropargyl inositol, hexapropargyl inositol, dipropargylpiperazine, dipropargyl citrate, tripropargyl citrate, cyclohexanedimethanol propargyl ether, cyclohexanedimethanol dipropargyl ether, quinic acid lactone propargyl ether, quinic acid lactone dipropargyl ether, quinic acid lactone tripropargyl ether, tricyclodecanedimethanol propargyl ether, tricyclodecanedimethanol dipropargyl ether, bisphenol A bis(propargyl ether), hydrogenated bisphenol A bis (propargyl ether), cyclohexane dipropargyl ether, cyclohexane tripropargyl ether, cyclohexane tetrapropargyl ether, cyclohexane pentapropargyl ether, cyclohexane hexapropargyl ether, propargyl resorcinol, dipropargyl resorcinol, and combinations thereof.

25. The method of claim 14, wherein the epoxy-containing constituent is selected from the group consisting of epoxidized terpenes, epoxidized terpenoids, epoxidized dimerized terpenes, epoxidized dimerized terpenoids, epoxidized trimerized terpenes, epoxidized trimerized terpenoids, epoxidized oligomeric terpenes, epoxidized oligomeric terpenoids, epoxidized polymerized terpenes, epoxidized polymerized terpenoids, limonene oxide, limonene dioxide, poly(limonene oxide), poly(isoprene oxide)-co-polyisoprene copolymers, poly(butadiene oxide)-co-polybutadiene copolymers, epoxidized farnesene, epoxidized farnesene, epoxidized myrcene, epoxidized bisabolene, epoxidized linalool, epoxidized terpinolene, epoxidized terpinene, epoxidized geraniol, epoxidized citral, epoxidized retinol, epoxidized beta-carotene, epoxidized arachidonic acid, epoxidized eleostearic acid epoxidized linoleic acid, epoxidized linolenic acid, epoxidized linseed oil, epoxidized tung oil, epoxidized soybean oil, epoxidized peanut oil, epoxidized walnut oil, epoxidized avocado oil, epoxidized sunflower oil, epoxidized corn oil, epoxidized cottonseed oil, epoxidized palm oil, epoxidized glycerol, glycerol diglycidyl ether, glycerol triglycidyl ether, epoxidized sorbitol, sorbitol diglycidyl ether, sorbitol triglycidyl ether, sorbitol tetraglycidyl ether, sorbitol pentaglycidyl ether and sorbitol hexaglycidyl ether, cyclohexanedimethanol diglycidyl ether, resorcinol diglycidyl ether, bisphenol A diglycidyl ether, hydrogenated bisphenol A diglycidyl ether, neopentyl glycol diglycidyl ether, ethylene glycol diglycidyl ether, 1,4-butanediol diglycidyl ether, tetraethylene glycol diglycidyl ether, polydimethylsiloxane diglycidyl ether, epoxidized butadiene oligomers, epoxidized butadiene-co-polynitrile oligomers, epoxidized grapefruit mercaptan, ethoxylated bisphenol A diglycidyl ether, ethoxylated hydrogenated bisphenol A diglycidyl ether, ethoxylated cyclohexanedimethanol diglycidyl ether, and combinations thereof.

26. The method of claim 14, wherein the mixture of step (a) further comprises one or more modifiers selected from the group consisting of sand, polymer powders, hydroxyapatite nanopowder, tungsten powder, metal powders, ceramic powders, and combinations thereof.

27. The method of making of claim 14, wherein the thermal aging step comprises applying heat to the mixture at a temperature range between about 0° C. to about 150° C.

28. The method of making of claim 14, wherein the thermal aging step is applied for a period of time of between about 0.01 hours to about 24 hours.

29. The method of making of claim 14, wherein the thermal aging step comprises agitation of the mixture.

30. A method of printing a curable formulation according to claim 1, the method comprising the steps of:
(a) printing a thermally aged curable formulation comprising a polythiol constituent; an alkene-containing and/or alkyne-containing monomeric and/or oligomeric constituent; and an epoxy-containing constituent; and
(b) curing the printed formulation
wherein the curing step is performed simultaneously with the printing of the thermally aged curable formulation of step (a).

31. The method of printing of claim 30, wherein the thermally aged curable formulation further comprises an initiator.

32. The method of printing of claim 31, wherein the initiator is 2,2-dimethoxy-2-phenylacetophenone or diphenyl(2,4,6-trimethylbenzoyl)phosphine oxide.

33. The method of printing of claim 31, wherein the curing step comprises exposure of the jetted formulation to light or heat which decomposes the initiator.

34. The method of printing of claim 31, wherein the printing is performed by a stereolithographic additive printing, dynamic light projection printing, an inkjet printing, a photojet printing, or a direct write process.

35. The method of printing of claim 30, wherein the printing step comprises jetting the thermally aged curable formulation into one or more powders selected from the group consisting of sand, polymer powders, hydroxyapatite powders, and tungsten powders.

36. The curable formulation of claim 1, wherein the polythiol constituent is monomeric and/or oligomeric.

37. The curable formulation of claim 1, wherein the epoxy-containing constituent is monomeric and/or oligomeric.

38. The curable formulation of claim 1, further comprising one or more modifiers selected from the group consisting of trimethylolpropane tris(3-mercaptopropionate), pentaerithritol tetrakis(3-mercaptopropionate), dipentaerithritol hexakis(3-mercaptopropionate), tris[2-(3-mercaptopropionyloxy)ethyl]isocyanurate, tetraethylene glycol bis(3-mercaptopropionate), 1,10-decanedithiol, ethylene glycol bis(3-mercaptopropionate), 1,2-ethanedithiol, 1,3-propanedithiol, 1,4-butanedithiol, 1,6-hexanedithiol, 1,8-octanedithiol, 2-mercaptoethanol, 2-hydroxyethylacrylate, 2-carboxyethylacrylate, acrylic acid, thioglycolic acid, iso-tridecyl 3-mercaptopropionate, sodium thioglycolate, butyl glycidyl ether, 2-ethylhexyl glycidyl ether, limonene oxide, limonene dioxide, dicyclopentadiene dioxide, castor oil glycidyl ether, 2-amino-2-methyl-1-propanol, vinyl cyclohexene oxide, allyl isothiocyanate, isophorone diisocyanate, bisphenol A ethoxylate diacrylate, bisphenol A ethoxylate diglycidyl ether, ethoxylated trimethylolpropane tris(3-mercaptopropionate), pentaerithritol tetrakis(mercaptopropionate terminated), [polydimethylsiloxane, diglycidyl ether terminated], glycerol diacrylate, glycerol triacrylate, allyl glycidyl ether, and combinations thereof.

39. The method of claim 14, wherein the mixture of step (a) further comprises one or more modifiers which selected from the group consisting of trimethylolpropane tris(3-mercaptopropionate), pentaerithritol tetrakis(3-mercaptopropionate), dipentaerithritol hexakis(3-mercaptopropionate), tris[2-(3-mercaptopropionyloxy)ethyl]isocyanurate, tetraethylene glycol bis(3-mercaptopropionate), 1,10-decanedithiol, ethylene glycol bis(3-mercaptopropionate), 1,2-ethanedithiol, 1,3-propanedithiol, 1,4-butanedithiol, 1,6-hexanedithiol, 1,8-octanedithiol, 2-mercaptoethanol, 2-hydroxyethylacrylate, 2-carboxyethylacrylate, acrylic acid, thioglycolic acid, iso-tridecyl 3-mercaptopropionate, sodium thioglycolate, butyl glycidyl ether, 2-ethylhexyl glycidyl ether, limonene oxide, limonene dioxide, dicyclopentadiene dioxide, castor oil glycidyl ether, 2-amino-2-methyl-1-propanol, vinyl cyclohexene oxide, allyl isothiocyanate, isophorone diisocyanate, bisphenol A ethoxylate diacrylate, bisphenol A ethoxylate diglycidyl ether, ethoxylated trimethylolpropane tris(3-mercaptopropionate), pentaerithritol tetrakis(mercaptopropionate terminated), [polydimethylsiloxane, diglycidyl ether terminated], glycerol diacrylate, glycerol triacrylate, allyl glycidyl ether, and combinations thereof.

\* \* \* \* \*